(12) United States Patent
Ishikuri

(10) Patent No.: US 10,348,952 B2
(45) Date of Patent: Jul. 9, 2019

(54) USING BLUETOOTH LOW ENERGY FOR WIRELESS LAN ACCESS POINT DETECTION NOTIFICATION

(71) Applicant: CANON KABUSHIKI KAISHA, Tokyo (JP)

(72) Inventor: Ryuichi Ishikuri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/545,578

(22) PCT Filed: Feb. 1, 2016

(86) PCT No.: PCT/JP2016/053877
§ 371 (c)(1),
(2) Date: Jul. 21, 2017

(87) PCT Pub. No.: WO2016/125913
PCT Pub. Date: Aug. 11, 2016

(65) Prior Publication Data
US 2018/0091725 A1    Mar. 29, 2018

(30) Foreign Application Priority Data
Feb. 2, 2015  (JP) ................................ 2015-018303

(51) Int. Cl.
*H04N 5/232* (2006.01)
*H04W 84/12* (2009.01)
(Continued)

(52) U.S. Cl.
CPC .......... *H04N 5/23206* (2013.01); *H04W 4/80* (2018.02); *H04W 52/0225* (2013.01);
(Continued)

(58) Field of Classification Search
CPC .... H04N 5/23206; H04W 4/80; H04W 76/16; H04W 52/0229; H04W 84/12; H04W 88/06
See application file for complete search history.

(56) References Cited

U.S. PATENT DOCUMENTS

| 9,888,501 | B2* | 2/2018 | Borges | H04L 67/12 |
| 2008/0058031 | A1* | 3/2008 | Deprun | H04W 52/0229 |
| | | | | 455/574 |

(Continued)

FOREIGN PATENT DOCUMENTS

| JP | 2011-514777 A | 5/2011 |
| JP | 2012-134891 A | 7/2012 |

(Continued)

OTHER PUBLICATIONS

The above US and WO publications were cited the International Search Report of International Application No. PCT/JP2016/053877 dated May 31, 2016.

(Continued)

*Primary Examiner* — Chi H Pham
*Assistant Examiner* — Weibin Huang
(74) *Attorney, Agent, or Firm* — Cowan, Liebowitz & Latman, P.C.

(57) ABSTRACT

A communication apparatus which, in a process for establishing a wireless communication, lowers power consumption and at the same time, saves a user from having to perform operation. A first communication unit receives a signal sent from an external apparatus using a first communication system. A second communication unit communicates with another communication apparatus different from the external apparatus using a second communication system different from the first communication system. When the signal received from the external apparatus by the first communication unit is a signal from a predetermined exter- (Continued)

nal apparatus, control is provided to send a signal for starting a communication unit of the other communication apparatus, which carries out communications using the first communication system, to the other communication apparatus using the second communication unit. The first communication system may be Wireless Lan (LAN), the second communication system may be Bluetooth Low Energy (BLE).

15 Claims, 15 Drawing Sheets

(51) Int. Cl.
    *H04W 88/06*     (2009.01)
    *H04W 52/02*     (2009.01)
    *H04W 76/16*     (2018.01)
    *H04W 4/80*     (2018.01)

(52) U.S. Cl.
    CPC ....... *H04W 52/0229* (2013.01); *H04W 76/16* (2018.02); *H04W 84/12* (2013.01); *H04W 88/06* (2013.01); *Y02D 70/1242* (2018.01); *Y02D 70/1262* (2018.01); *Y02D 70/142* (2018.01); *Y02D 70/144* (2018.01); *Y02D 70/166* (2018.01)

(56) References Cited

U.S. PATENT DOCUMENTS

2009/0111378 A1*   4/2009   Sheynman ............ H04W 8/005
                                                   455/41.1
2009/0219844 A1   9/2009   Soliman
2013/0099920 A1   4/2013   Song et al.
2015/0146241 A1*   5/2015   Lee ..................... H04N 1/00103
                                                   358/1.15
2015/0245351 A1   8/2015   Banerjea et al.
2015/0327069 A1*  11/2015   Fu ......................... H04W 12/06
                                                    726/5
2016/0112947 A1*   4/2016   Sahoo ............... H04W 28/0221
                                                   370/311
2016/0302026 A1*  10/2016   Lee ....................... H04W 76/14

FOREIGN PATENT DOCUMENTS

| | | |
|---|---|---|
| JP | 2014-131184 A | 7/2014 |
| KR | 10-2012-0040277 A | 4/2012 |
| WO | 2013/184110 A1 | 12/2013 |
| WO | 2014/182377 A2 | 11/2014 |

OTHER PUBLICATIONS

The above foreign patent document was cited in the Jul. 20, 2018 Korean Office Action, which is enclosed without an English Translation, that issued in Korean Patent Application No. 10-2017-7021243.

The above patent documents were cited in a Japanese Office Action dated Sep. 11, 2018, which is enclosed, that issued in the corresponding in Japanese Patent Application No. 2015018303.

* cited by examiner

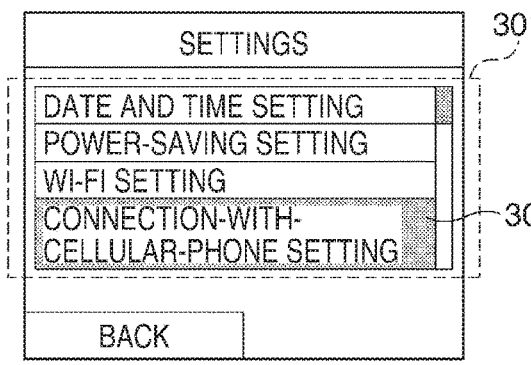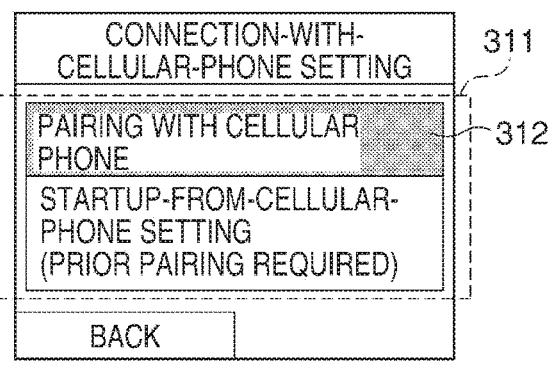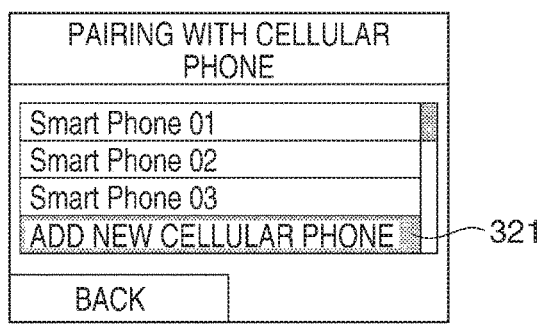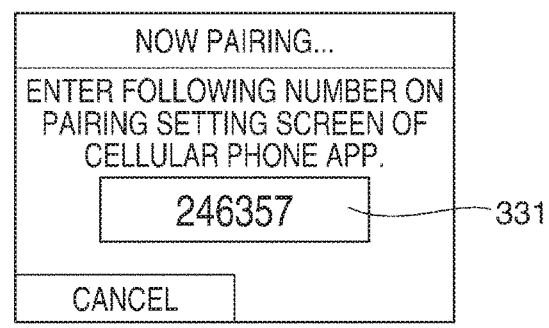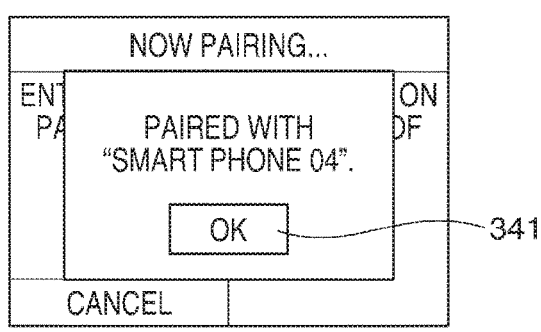

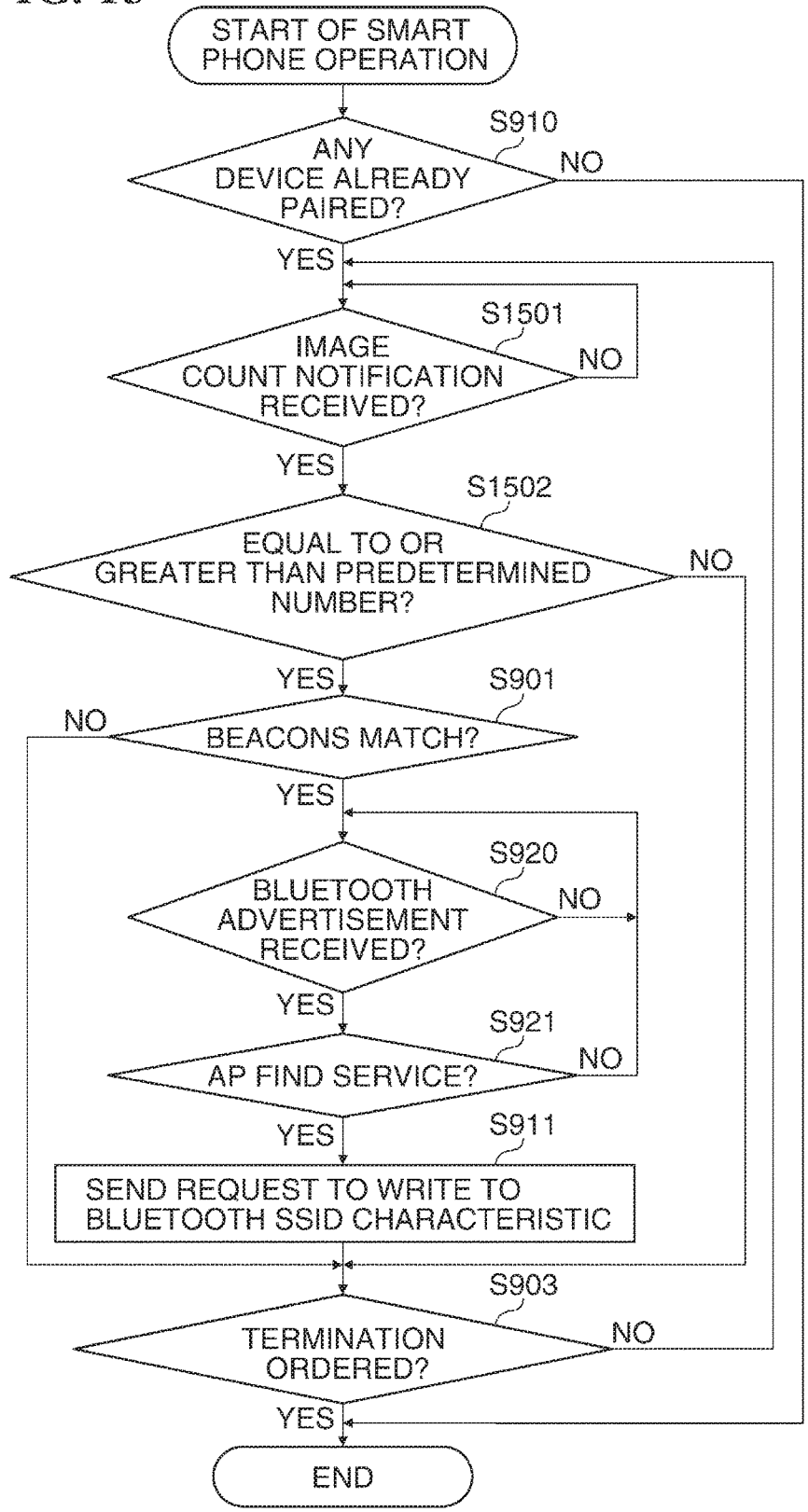

USING BLUETOOTH LOW ENERGY FOR WIRELESS LAN ACCESS POINT DETECTION NOTIFICATION

CROSS-REFERENCE TO RELATED APPLICATIONS

This application is a national stage application of International Application No. PCT/JP2016/053877 filed Feb. 1, 2016, whose benefit is claimed and which claims the benefit of Japanese Patent Application No. 2015-018303 filed Feb. 2, 2015, the entire disclosure of which are incorporated herein by reference.

TECHNICAL FIELD

The present invention relates to a communication apparatus, a control method therefor, and a storage medium, and in particular to a communication apparatus capable of carrying out wireless communications.

BACKGROUND ART

In recent years, image pickup apparatuses such as digital cameras are equipped with a wireless communication function to access a network via an access point. For example, PTL (patent literature) 1 discloses a camera which uploads an image to a server on a network via an access point.

CITATION LIST

Patent Literature

{PTL 1} Japanese Laid-Open Patent Publication (Kokai) No. 2014-131184

SUMMARY OF INVENTION

Technical Problem

According to PTL 1 above, however, connecting to an access point requires a user operation.

Specifically, for example, when a user comes home after taking a lot of shots, he or she needs to take a camera out of a bag, turn the power on to display a menu, and perform an operation for establishing a wireless connection. To save the effort of having to do this, continuously searching for an access point is conceivable, but this is unrealistic from the standpoint of power consumption.

The present invention provides a communication apparatus and a control method therefor which, in a process for establishing a wireless communication, lower power consumption and at the same time, save a user from having to perform operation, as well as a storage medium.

Solution to Problem

Accordingly, a first aspect of the present invention provides a communication apparatus comprising a first communication unit configured to receive a signal sent from an external apparatus using a first communication system, a second communication unit configured to communicate with another communication apparatus different from the external apparatus using a second communication system different from the first communication system, and a control unit configured to, when the signal received from the external apparatus by the first communication unit is a signal from a predetermined external apparatus, provide control to send a signal for starting a communication unit of the other communication apparatus, which carries out communications using the first communication system, to the other communication apparatus using the second communication unit, wherein power consumed by communication using the second communication unit is lower than power consumed by communication using the first communication unit.

Advantageous Effects of Invention

According to the present invention, in a process for establishing a wireless communication, power consumption is lowered, and at the same time, a user is saved from having to perform operation.

The further features of the present invention will become more apparent from the following description of exemplary embodiments (with the accompanying drawings).

BRIEF DESCRIPTION OF DRAWINGS

FIG. 3A is a view useful in explaining how a pairing setting menu is selected in the camera in FIG. 1 and showing a setting top screen.

FIG. 3B is a view useful in explaining how a pairing setting menu is selected in the camera in FIG. 1 and showing a connection setting screen.

FIG. 3C is a view useful in explaining how a pairing setting menu is selected in the camera in FIG. 1 and showing a pairing screen.

FIG. 3D is a view useful in explaining how a pairing setting menu is selected in the camera in FIG. 1 and showing a PIN confirmation screen.

FIG. 3E is a view useful in explaining how a pairing setting menu is selected in the camera in FIG. 1 and showing a pairing completion screen.

FIG. 15 is a flowchart useful in explaining how a smart phone operates during image transmission in the communication system according to the third embodiment of the present invention.

DESCRIPTION OF EMBODIMENTS

Exemplary communication apparatuses according to embodiments of the present invention will now be described with reference to the drawings.

Figure 1:
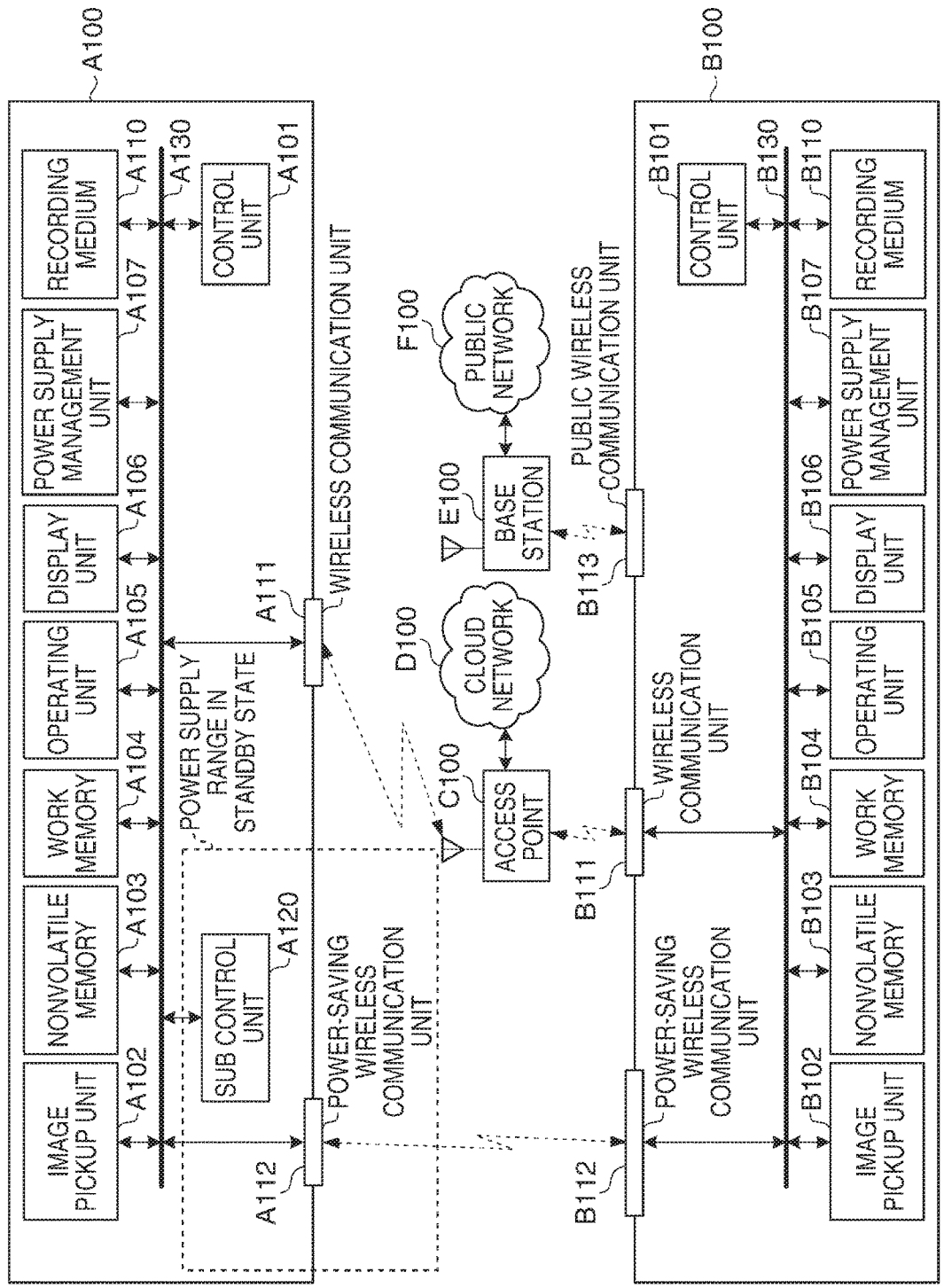
FIG. 1 is a block diagram showing an exemplary communication system for which a communication apparatus according to a first embodiment of the present invention is used.

FIG. 1 is a block diagram showing an exemplary communication system for which a communication apparatus according to a first embodiment of the present invention is used.

In the communication system shown in the figure, an image pickup apparatus and a mobile terminal device which are equipped with a wireless communication function are used as communication apparatuses. The image pickup apparatus is, for example, a digital camera (hereafter referred to as the camera) which is a communication apparatus, and the mobile terminal device is, for example, a smart phone which is another communication apparatus. It should be noted that the other communication apparatus may also be a mobile media player, a so-called tablet device, or an information processing apparatus such as a personal computer.

The camera A100 has a control unit A101, which controls the overall camera A100 in accordance with control programs. It should be noted that the overall camera A100 may not be controlled by the control unit A101, but the overall camera A100 may be controlled by a plurality of pieces of hardware sharing processing.

An image pickup unit A102 has, for example, an optical lens unit with a diaphragm, zooming, and focusing function, and an image pickup device which outputs an electric signal (analog signal) corresponding to an optical image formed by the optical lens unit and performs A/D conversion of this analog signal to obtain a digital signal.

Here, for example, a CMOS (complementary metal oxide semiconductor) or CCD (charge-coupled device) image sensor is used as the image pickup device. Under the control of the control unit A101, the image pickup unit A102 outputs an electric signal corresponding to an optical image, carries out a noise reduction process or the like on the electric signal, and then outputs a digital signal as image data.

It should be noted here that image data is recorded in a recording medium A110 according to DCF (design rule for camera file system) standards.

A nonvolatile memory A103, which is electrically erasable and recordable, stores control programs, which are executed by the control unit A101, and others. A work memory A104 is used as a buffer memory which temporarily records image data obtained as a result of image pickup by the image pickup unit A102 and used as an image display memory and a work area for the control unit A101.

An operating unit A105 is used to receive instructions from a user. The operating unit A105 includes, for example, a power button for turning on or off the power to the camera A100, a release switch for issuing a shooting instruction, and a reproducing button for ordering reproduction of image data. It should be noted that a touch panel formed on a display unit A106, to be described later, is also included in the operating unit A105.

On the display unit A106, a live view is displayed in a shooting preparation stage for taking a still image, and also a still image obtained as a result of image picking-up is displayed. Further, characters for interactive operations and others are displayed on the display unit A106.

A power supply management unit A107 supplies power to the camera A100. The power supply management unit A107 is able to supply power to the overall camera A100 and also supply power solely to a sub control unit A120 and a power-saving wireless communication unit A112, to be described later.

In the following description, a state in which power is supplied to the entire camera A100 is referred to as a power-on state (second mode), and a state in which power is supplied solely to the sub control unit A120 and the power-saving wireless communication unit A112 is referred to as a standby state (first mode). A state in which power to the entire camera A100 is off is referred to as a power-off state. In the standby state, power consumption of the camera A100 is maintained extremely low.

Image data obtained as a result of image pickup by the image pickup unit A102 is recorded in the recording medium A110. It should be noted that the recording medium A110 is removable from the camera A100 but may be incorporated in the camera A100.

A wireless communication unit A111 is an interface for carrying out communications on a wireless LAN conforming to, for example, IEEE 802.11 standards (first communication system). Through the wireless LAN communications, the camera A100 is able to carry out wireless communications with a wireless access point (hereafter referred to as the access point or the AP) C100. Further, the camera A100 is able to send and receive data to and from server equipment (external equipment, not shown), which is connected to a cloud network D100, via the access point C100 using an upper layer protocol such as TCP/IP.

The power-saving wireless communication unit A112 has an antenna for wireless communication, a modulation-demodulation circuit for processing wireless signals, and a communication controller. The power-saving wireless communication unit A112 outputs wireless signals from the antenna and also demodulates wireless signals received through the antenna to carry out near-field wireless communications according to IEEE 802.15 standards (i.e. Bluetooth (registered trademark)).

In the example shown in the figure, it is assumed that low-power consumption (second power consumption) Bluetooth Low Energy version 4.0 is used for Bluetooth communication (second communication system). In this Bluetooth communication, the range where communication is possible is narrow (that is, the distance over which communication is possible is short) as compared to wireless LAN communication. Also, the communication speed of the Bluetooth communication is lower than that of wireless LAN communication. On the other hand, the Bluetooth communication consumes a small amount of power as compared to wireless LAN communication. Supposing that the amount of power consumed by wireless LAN communication is first power consumption, the first power consumption is larger than the second power consumption.

The sub control unit A120 is responsible for controlling communications using the power-saving wireless communication unit A112, as well as the camera A100 in the standby state. The sub control unit A120 has a work memory and a nonvolatile memory, which are required for operation of the sub control unit A120, incorporated therein, and is thus able to operate even in the standby state in which no power is supplied to the nonvolatile memory A103 and the work memory A104.

Moreover, the sub control unit A120 enables communication with a smart phone B100, to be described later, using the power-saving wireless communication unit A112 even when the camera A100 is in the standby state. Further, according to communication of the power-saving wireless communication unit A112, the sub control unit A120 brings the camera A100 back from the standby state to the power-on state (second mode) through the power supply management unit A107. It should be noted that the blocks in FIG. 1 are connected to one another by an internal bus A130.

The smart phone B100 has a control unit B101, which controls the overall smart phone B100 in accordance with control programs. It should be noted that the overall smart phone B100 may not be controlled by the control unit B101, but the overall smart phone B100 may be controlled by a plurality of pieces of hardware sharing processing.

The smart phone B100 shown in the figure has an image pickup unit B102, which is the same as the image pickup unit A101 described above, and image data obtained by the image pickup unit B102 is recorded in a recording medium B110 according to the DCF standards.

A nonvolatile memory B103 is the same as the nonvolatile memory A103, and for example, control programs which are executed by the control unit B101 are stored in the nonvolatile memory B103. A work memory B104 is the same as the work memory A104 and used as a buffer memory, an image display memory, and a work area for the control unit B101.

An operating unit B105 is used to receive instructions from a user. The operating unit B105 includes, for example, a power button for turning on or off the power to the smart phone B100, and an operating button for ordering transition of screens. It should be noted that a touch panel formed on a display unit B106, to be described later, is also included in the operating unit B105.

On the display unit B106, a still image obtained as a result of shooting is displayed. Further, a GUI (graphical user interface) for performing interactive operations is also displayed on the display unit B106. Note that the smart phone B100 should not necessarily have the display unit B106 but have only to be equipped with a display control function of controlling what is displayed.

A power supply management unit B107 is a unit for supplying power to the smart phone B100. It should be noted that the recording medium B110 is removable from the smart phone B100 but may be incorporated in the smart phone B100. A wireless communication unit B111 is the same as the wireless communication unit A111, and a power-saving wireless communication unit B112 is the same as the power-saving wireless communication unit A112.

A public wireless communication unit B113 is an interface for carrying out communications over a public network F100 by way of a base station E100. The public wireless communication unit B113 has an antenna for wireless communication, a modulation-demodulation circuit for processing wireless signals, and a communication controller. In the example shown in the figure, the public wireless communication unit B113 carries out public wireless communications according to standards such as W-CDMA (UMTS) or LTE (long term evolution).

It should be noted that the above blocks are connected to one another by an internal bus B130. Although in the example shown in FIG. 1, the camera A100 and the smart phone B100 carry out one-to-one communications, the camera A100 is allowed to carry out one-to-many communications with a plurality of smart phones.

Next, a description will be given of an initializing operation which is performed by the camera A100 so as to enable the smart phone B100 and the camera A100 in FIG. 1 to communicate with each other using the power-saving wireless communication units B112 and A112.

Figure 2:
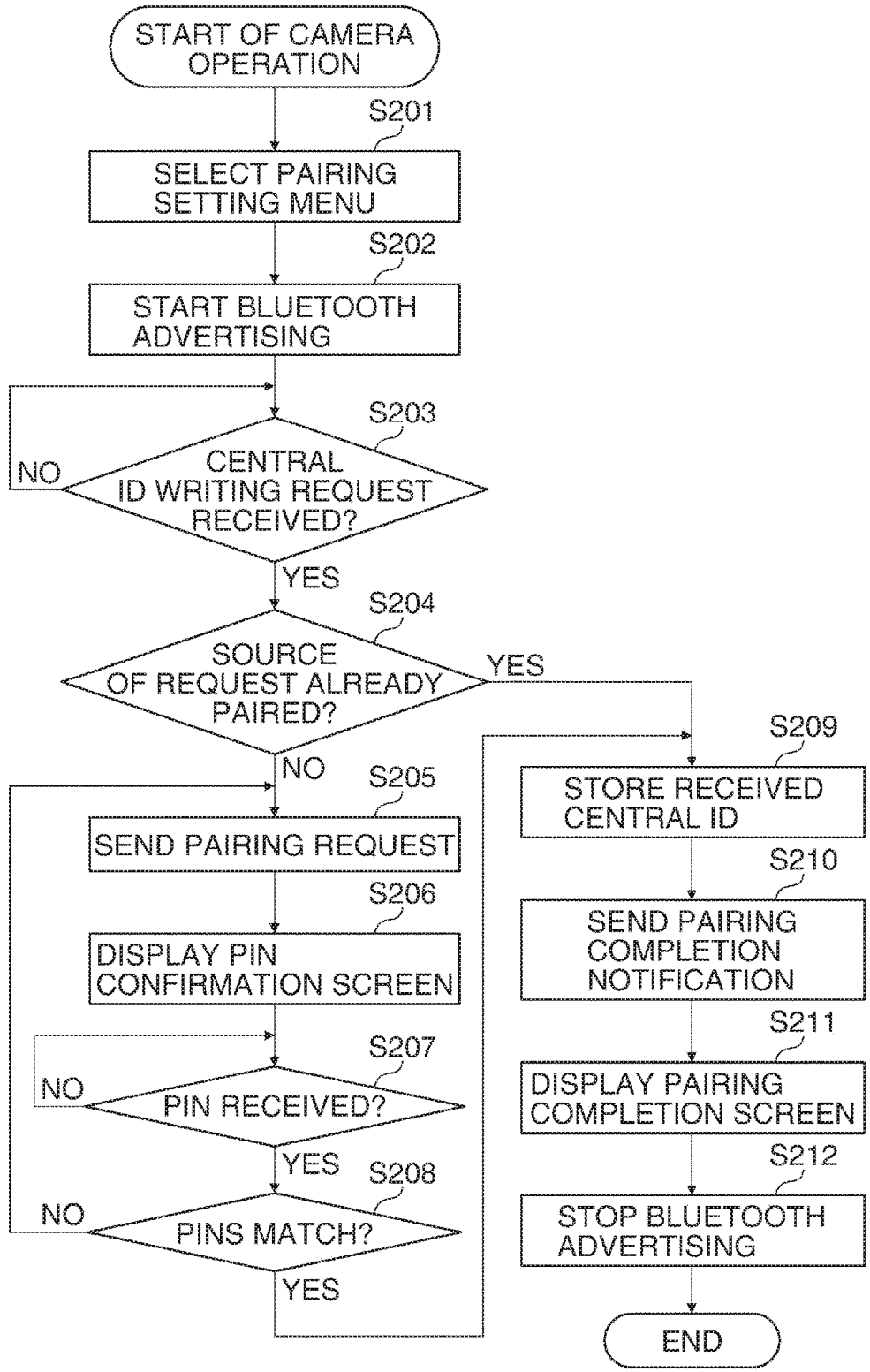
FIG. 2 is a flowchart showing an initializing operation which is performed by a camera in FIG. 1.

FIG. 2 is a flowchart useful in explaining an initialization operation which is performed by the camera A100 in FIG. 1. It should be noted that the process of the flowchart in the figure is carried out under the control of the control unit A101.

Prior to the process in FIG. 2, the power to the camera A100 is turned on in advance, and a user is allowed to change settings on the camera A100 using the operating unit A102. In configuring the settings, the smart phone B100 and the camera A100 carry out a communication using BLE, and on this occasion, the smart phone B100 acts as a BLE central, and the camera A100 acts as a BLE peripheral.

In step S201, the control unit A101 displays a setting menu screen and stands by until the user selects a pairing setting menu using the operating unit A105. It should be noted that the setting menu screen will be described later.

In step S202, the control unit A101 advertises pairing information for starting pairing using the power-saving wireless communication unit A112. For example, the control unit A101 advertises an AP Find Service for pairing using the BLE GATT profile.

The AP Find Service includes a central ID characteristic to which a connection target device, which requires initialization (hereafter referred to as the central), writes ID information for uniquely identifying the central, and a status characteristic indicative of the progress of initialization. In the step S202, advertisement is performed with a null value set in the central ID characteristic, and a character string "Initializing" set in the status characteristic. BLE advertising is automatically repeated by the power-saving wireless communication unit A112 until the control unit A101 explicitly issues a stop instruction.

As will be described later, the AP Find Service also includes an SSID characteristic to which the central writes an SSID (network identifier) of the access point C100 that has received a beacon.

In step S203, the control unit A101 judges whether or not in response to the advertisement, the central has made a request to write to the central ID characteristic. This request corresponds to a request made by the smart phone B100 as will be described later. Upon determining that the writing request has not been made, the control unit A101 repeatedly caries out the process in the step S203 until the writing request is made. When the control unit A101 judges that the writing request has been made, the process proceeds to step S204.

In the step S204, the control unit A101 judges whether or not BLE pairing of the central that has made the writing request has already been completed. When the control unit A101 judges that BLE pairing has already been completed, the process proceeds to step S209, to be described later.

On the other hand, when the control unit A101 judges that pairing has not been completed yet, the process proceeds to step S205. In the step S205, the power-saving wireless communication unit A112 sends a pairing request to the central under the control of the control unit A101. Then, in step S206, the control unit A101 displays a PIN confirmation screen on the display unit A106. Here, 6-digit numeric values which vary among pairing requests are generated and used as PIN numbers.

Then, in step S207, the control unit A101 judges whether or not the power-saving wireless communication unit A112 has received a PIN number from the central. The receipt of a PIN number corresponds to sending by the smart phone B101. Upon determining that no PIN number has been received, the control unit A101 repeatedly carries out the process in the step S207 until a PIN number is received.

When the control unit A101 determines that a PIN number has been received, the process proceeds to step S208. In the step S208, the control unit A101 determines whether or not the received PIN number matches the PIN number generated in the step S206.

When the control unit A101 judges that the PIN numbers do not match, the process returns to the step S205, in which the control unit A101 sends a pairing request again. On the other hand, when the control unit A101 judges that the PIN numbers match, the process proceeds to step S209.

In the step S209, the control unit A101 stores the central ID value of the AP Find Service in the nonvolatile memory A103. Here, the control unit A101 stores the central ID value in a nonvolatile memory, which is incorporated in the sub control unit A120, as well.

Then, in step S210, the control unit A101 notifies the central that initialization has been completed using the power-saving wireless communication unit A112. For example, the control unit A101 configures a value of the status characteristic at "Success" to enable the central, which has received the advertisement, to know that initialization has been completed.

Then, in step S211, the control unit A101 displays a pairing completion screen on the display unit A106. It should be noted that the pairing completion screen will be described later. Then, in step S212, the control unit A101 stops advertisement of the BLE AP Find Service started in the step S202 by the power-saving wireless communication unit A112. After that, the control unit A101 ends the initializing operation. This brings the central and the peripheral into a state of being connected to each other.

It should be noted that when the central and the peripheral have shifted into a state of being connected to each other, the central and the peripheral send and receive packets to and from each other at regular time intervals. While this communication is maintained, the central and the peripheral are regarded as being connected to each other. If a communication from the party at the other end is not reached, connection is terminated.

FIGS. 3A to 3E are views useful in explaining how a pairing setting menu is selected in the camera A100 in FIG. 1. FIG. 3A is a view showing a setting top screen, and FIG. 3B is a view showing a connection setting screen. FIG. 3C is a view showing a pairing screen, and FIG. 3D is a view showing a PIN confirmation screen. FIG. 3E is a view showing a pairing completion screen.

To select a pairing setting menu in the step S201, a user operates the operating unit A105 to display the setting top screen in FIG. 3A on the display unit A106. When, on this setting top screen, the user selects a connection-to-smart-phone B100 setting menu item 302 from a setting item list 301, the control unit A101 displays the connection setting screen in FIG. 3B on the display unit A106.

When, on the connection setting screen, the user selects a pairing-with-smart-phone B100 setting menu 312 from a setting item list 311, the control unit A101 displays the pairing screen in FIG. 3C on the display unit A106. The user then selects a new-smart-phone-add menu item 321 on the pairing screen. A pairing setting menu is thus selected on the camera A100.

FIG. 3D shows a PIN confirmation screen displayed on the display unit A106 through the process in the step S206 described with reference to FIG. 2. As for the PIN confirmation screen, the user does not need to perform any operation on the camera A100. By the user inputting a PIN code 331, which is displayed on the PIN confirmation screen, to the smart phone B100, pairing is executed, and the process proceeds to the step S207 in FIG. 2.

FIG. 3E shows a pairing completion screen displayed on the display unit A106 through the process in the step S212 described with reference to FIG. 2. When the user selects an OK button 341 on the pairing completion screen, the control unit A101 ends the process in the step S212.

A description will now be given of initialization which is performed by the smart phone B100 so that the smart phone B100 and the camera A100 in FIG. 1 can communicate with each other using the power-saving wireless communication units B112 and A112.

Figure 4:
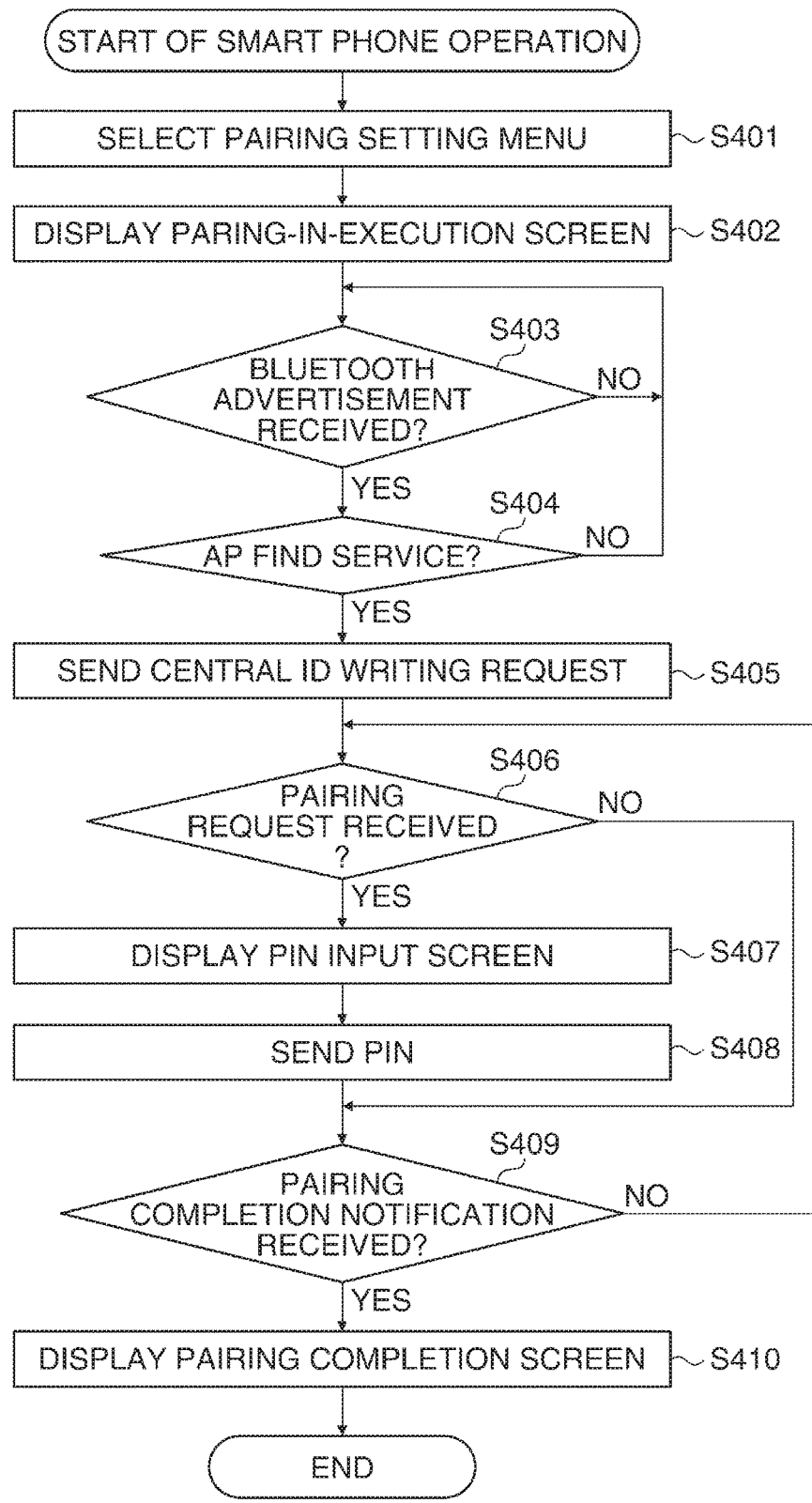
FIG. 4 is a flowchart useful in explaining an initializing operation performed by a smart phone in FIG. 1.

FIG. 4 is a flowchart useful in explaining an initializing operation which is performed by the smart phone in FIG. 1. The process of the flowchart in the figure is carried out under the control of the control unit B101.

It is assumed that prior to starting of the process of the flowchart in the figure, the user has started an application in the smart phone B100, which is for carrying out communications with the camera A100. In configuring initial settings, a BLE-based communication is carried out between the smart phone B100 and the camera A100, and on this occasion, the smart phone B100 acts as a BLE central, and the camera A100 acts as a BLE peripheral.

In step S401, the control unit B101 displays a setting menu screen on the display unit B106 and waits for the user to select a pairing setting menu. It should be noted that the setting menu screen will be described later.

When the process proceeds to step S402 as a result of user operation on the setting menu screen, the control unit B101 displays a pairing-in-execution screen on the display unit B106 in the step S402. Then, in step S403, the control unit B101 judges whether or not an advertisement has been received from the BLE peripheral using the power-saving wireless communication unit B112. The control unit B101 stands by until an advertisement has been received.

When an advertisement has been received, the control unit B101 judges in step S404 whether or not the received advertisement includes the AP Find Service. When the control unit B101 judges that the received advertisement does not include the AP Find Service, the process returns to the step S403.

When the control unit B101 judges that the received advertisement includes the AP Find Service, the process proceeds to step S405. It should be noted that an advertisement of the AP Find Service corresponds to an advertisement sent by the camera A100 in the step S202 described with reference to FIG. 2.

In the step S405, the control unit B101 generates a unique ID with which the smart phone B100 is identifiable and makes a request to write to the central ID characteristic of the AP Find Service. As described with reference to FIG. 2, the central ID characteristic of the AP Find Service is configured to require device-to-device authentication called pairing in BLE when its value is written.

Then, in step S406, the control unit B101 judges whether or not a pairing request has been received from the central. This pairing request corresponds to a pairing request sent in the step S205 with reference to FIG. 2, and the control unit B101 sends this pairing request only when BLE pairing with the peripheral, to which the central ID characteristic has been advertised, has not been completed using the power-saving wireless communication unit B112.

When the control unit B101 judges that the pairing request has not been received, that is, when the control unit B101 judges that pairing has already been completed, and it is possible to write a value to the central ID characteristic, the process proceeds to step S409. On the other hand, when the control unit B101 judges that the pairing request has been received, the process proceeds to step S407.

In the step S407, the control unit B101 displays a PIN input screen on the display unit B106. It should be noted that the PIN input screen will be described later. When the user enters a PIN number on the PIN input screen, the process proceeds to step S408 in which the control unit B101 sends the PIN number to the peripheral using the power-saving wireless communication unit B112. In response to the PIN number, the camera A100 which is the peripheral judges whether or not the PIN numbers match as described above.

Then, in step S409, the control unit B101 judges whether or not a pairing completion notification has been received. For example, the control unit B101 judges whether or not the value of the status characteristic of the AP Find Service is "Success". This determination corresponds to the process in the step S210 described with reference to FIG. 2, and when the received PIN number matches the PIN number generated by the camera A100 which is the peripheral, the camera A100 sends a pairing completion notification.

Upon determining that no pairing completion notification has been received, the control unit B101 judges that the input PIN number is not correct, and the process returns to the step S406. On the other hand, when the control unit B101 judges that a pairing completion notification has been received, the process proceeds to step S410. In the step S410, the control unit B101 displays a pairing completion screen on the display unit B106. It should be noted that the pairing completion screen will be described later. Then, when the pairing completion screen is closed, the control unit B101 ends initialization.

Figure 5A:
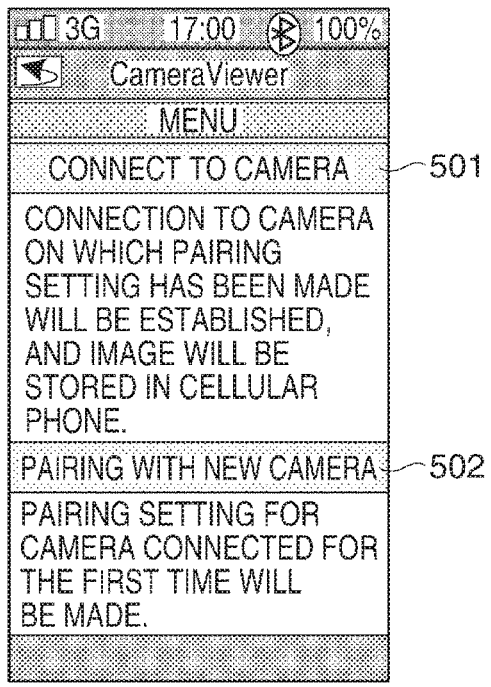
FIG. 5A is a view useful in explaining how a pairing setting menu is selected in the smart phone in FIG. 1 and showing a setting top screen.
Figure 5B:
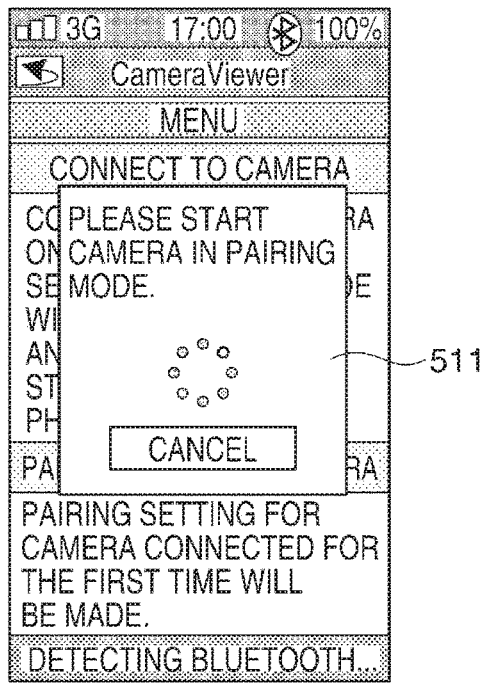
FIG. 5B is a view useful in explaining how a pairing setting menu is selected in the smart phone in FIG. 1 and showing a pairing-in-execution screen.
Figure 5C:
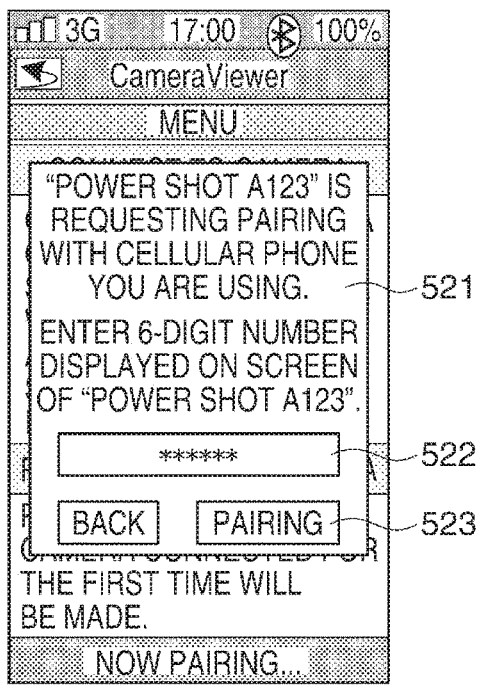
FIG. 5C is a view useful in explaining how a pairing setting menu is selected in the smart phone in FIG. 1 and showing a PIN input screen.
Figure 5D:
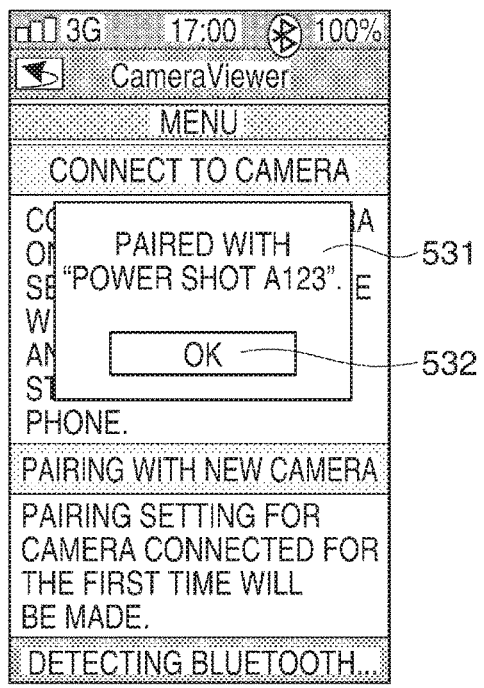
FIG. 5D is a view useful in explaining how a pairing setting menu is selected in the smart phone in FIG. 1 and showing a pairing completion screen.

FIGS. 5A to 5D are views useful in explaining how a pairing setting menu is selected in the smart phone in FIG. 1. FIG. 5A is a view showing a setting top screen, and FIG. 5B is a view showing a pairing-in-execution screen. FIG. 5C is a view showing a PIN input screen, and FIG. 5D is a view showing a pairing completion screen.

To select a pairing setting menu in the step S401, the user operates the operating unit B105 to display the setting top screen in FIG. 5A on the display unit B106. On the setting top screen, an operating button 501 for connecting with a paired camera and an operating button 502 for pairing with a new camera, that is, a pairing button are displayed. When the user selects the pairing-with-new-camera button 502, the control unit B101 displays the pairing-in-execution screen in FIG. 5B on the display unit B106.

On the pairing-in-execution screen, a message 511 which prompts the user to start the camera A100 in a pairing mode is displayed, but on the pairing-in-execution screen, the user does not need to perform any operation on the smart phone B100 but needs to start the camera A100 in the pairing mode in accordance with the instruction. This operation has already been described for the step S201 with reference to FIG. 2. Then, as described earlier, a pairing process is started, and the process proceeds to the step S403.

FIG. 5C shows the PIN input screen displayed on the display unit B106 in the step S407 in FIG. 4. In accordance with a message 521, the user reads the PIN code (see FIG. 3D) displayed on the display unit A106 of the camera A100 and enters the PIN code 331 into a PIN input field 522 on the PIN input screen. Then, the user selects a pairing execution button 523. This operation completes the process in the step S407 in FIG. 4, and the process proceeds to the step S408.

FIG. 5D shows the pairing completion screen displayed on the display unit B106 in the step S410 in FIG. 4. On the pairing completion screen, words 531 saying that pairing has been performed are displayed, and when the user selects an OK button 532 on the pairing completion screen, the process in the step S410 in FIG. 4 is brought to an end.

In the camera A100, whether the camera A100 is brought into the power-off state or the standby state when the power button is tuned off is allowed to be selected by setting.

Figure 6A:
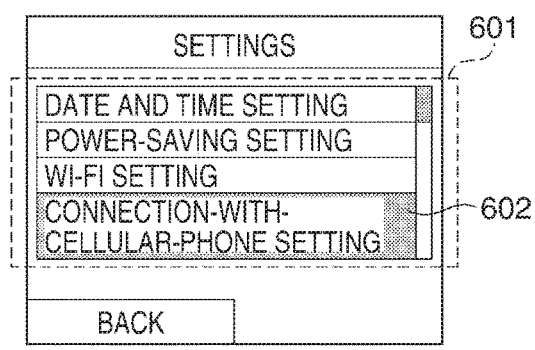
FIG. 6A is a view useful in explaining how camera settings are configured when a power button of the camera in FIG. 1 is turned off and showing a setting top screen.
Figure 6B:
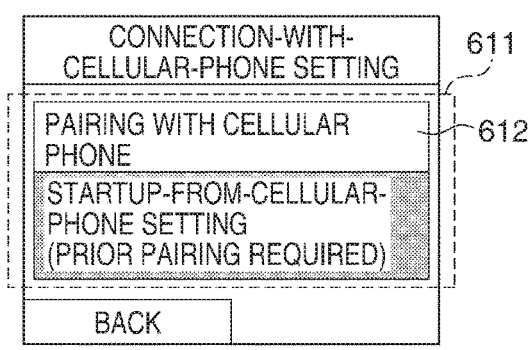
FIG. 6B is a view useful in explaining how camera settings are configured when a power button of the camera in FIG. 1 is turned off and showing a connection setting screen.
Figure 6C:
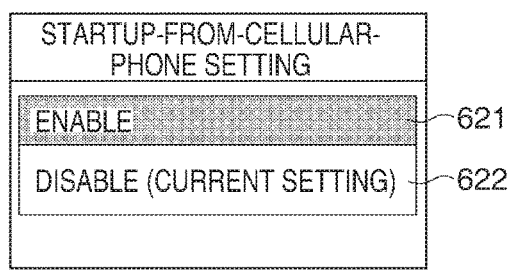
FIG. 6C is a view useful in explaining how camera settings are configured when a power button of the camera in FIG. 1 is turned off and showing a startup setting screen.

FIGS. 6A to 6C are views useful in explaining how to configure settings on the state of the camera when the power button of the camera in FIG. 1 is turned off. FIG. 6A is a view showing a setting top screen, and FIG. 6B is a view showing a connection setting screen. FIG. 6C is a view showing a startup setting screen.

When the user operates the operating unit A105 when turning off the power button of the camera A100, the control unit A101 displays the setting top screen in FIG. 6 on the display unit A106. When, on the setting top screen, the user selects a connection-with-smart-phone B101 setting menu item 602 from a setting item list 601, the control unit A101 displays the connection setting screen in FIG. 6B on the display unit A106.

When the user selects a starting-from-smart-phone setting menu 612 from a setting item list 611 on the connection setting screen, the control unit A101 displays the startup setting screen in FIG. 6C for the smart phone B100 on the display unit A106. On the startup setting screen, two choices consisting of an enable menu 621 and a disable menu 622 are displayed.

Assuming now that the user selects the enable menu 621, the control unit A101 brings the camera A100 into the standby state when the power button is turned off. On the other hand, when the user selects the disable menu 622, the control unit A101 brings the camera A100 into the power-off state when the power button is turned off.

Figure 7:
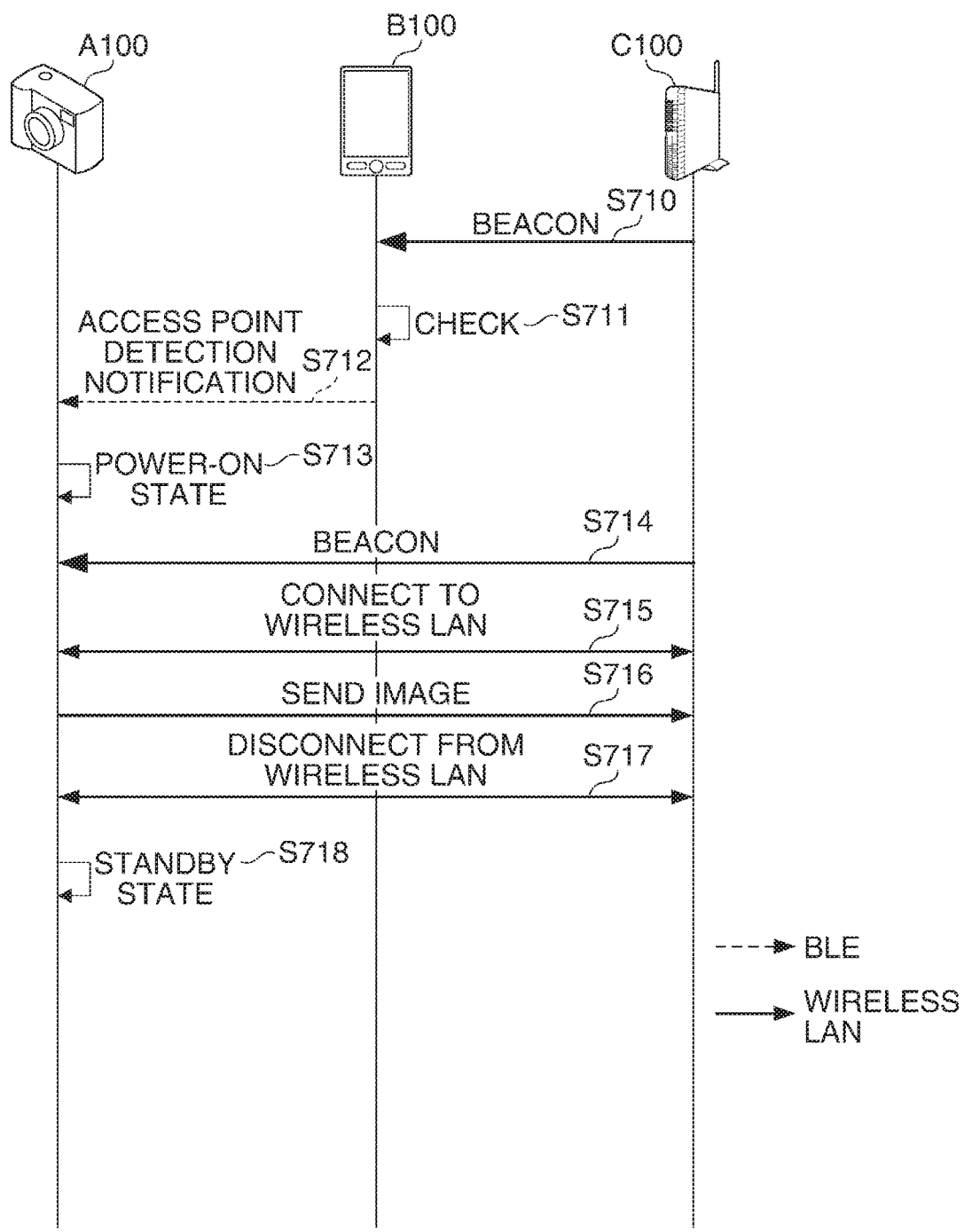
FIG. 7 is a sequence diagram useful in explaining the flow of a process from detection of an access point to sending of an image in the communication system in FIG. 1.

FIG. 7 is a sequence diagram useful in explaining the flow of a process from detection of an access point to sending of an image in the communication system in FIG. 7.

It should be noted that in FIG. 7, a broken-line arrow indicates that a communication is carried out using BLE, and a thick solid-line arrow indicates that a communication is carried out on a wireless LAN. Also, it is assumed that the camera A100 and the smart phone B100 have already been paired in advance using BLE. Further, it is assumed that SSID and password information on the access point C100 to which connection is desired is input through the operating unit A105 by the user and stored in the nonvolatile memory A103 in advance.

It is assumed here that in the smart phone B100, the power-saving wireless communication unit B112 is notified, from the camera A100, in advance of an SSID of the access point C100 to which connection is desired, and the SSID is stored in the nonvolatile memory B103. It is also assumed that when the sequence in the figure is started, the camera A100 is in the standby state.

In step S710, the smart phone B100 receives a beacon packet (also referred to merely as a beacon) broadcasted from the access point C100 by wireless LAN communication. Here, the access point C100 sends the beacon packet with access point information (for example, SSID and communication rate settings) added thereto.

In step S711, upon receiving the beacon packet, the smart phone B100 compares an SSID included in the received beacon packet to the SSID of the access point C100 to which connection is desired, which is sent from the camera A100 and stored in the nonvolatile memory B103 in advance, to judge whether they match each other.

When the SSID in the beacon packet is of the access point C100 to which connection is desired, the smart phone B100 sends an access point detection notification to the camera A100 using BLE in step S712. On this occasion, the smart phone B100 sends the access detection notification with access point information on the detected access point C100 added thereto to the camera A100.

It should be noted that before sending the access point detection notification to the camera A100, the smart phone B100 displays, on the display unit B106, an inquiry screen to inquire about whether or not to send the access point detection notification. The smart phone B100 stands by until it receives an instruction from the user, and only when a sending instruction is received, the smart phone B100 may send the access point detection notification to the camera A100.

When the access point detection notification is received, the sub control unit A120 in the camera A100 controls the power supply management unit A107 to bring the camera A100 from the standby state to the power-on state in step S713. Further, the sub control unit A120 enables the wireless LAN communication function of the wireless communication unit A111.

In step S714, the camera A100 receives a beacon packet broadcasted from the access point C100 by wireless LAN communication. Then, in step S715, the camera A100 establishes a wireless LAN connection with the access point C100 based on access point information included in the received beacon packet and the password information stored in advance in the nonvolatile memory A103.

Then, in step S716, the camera A100 transmits all images, which have not yet been uploaded, to a desired PC on the cloud network D100 using a wireless LAN by way of the access point C100. When image transmission is completed, the camera A100 and the access point C100 terminate the communication using the wireless LAN in step S717.

When the communication using the wireless LAN is terminated, the camera A100 shifts into the standby state in step S718.

Figure 8:
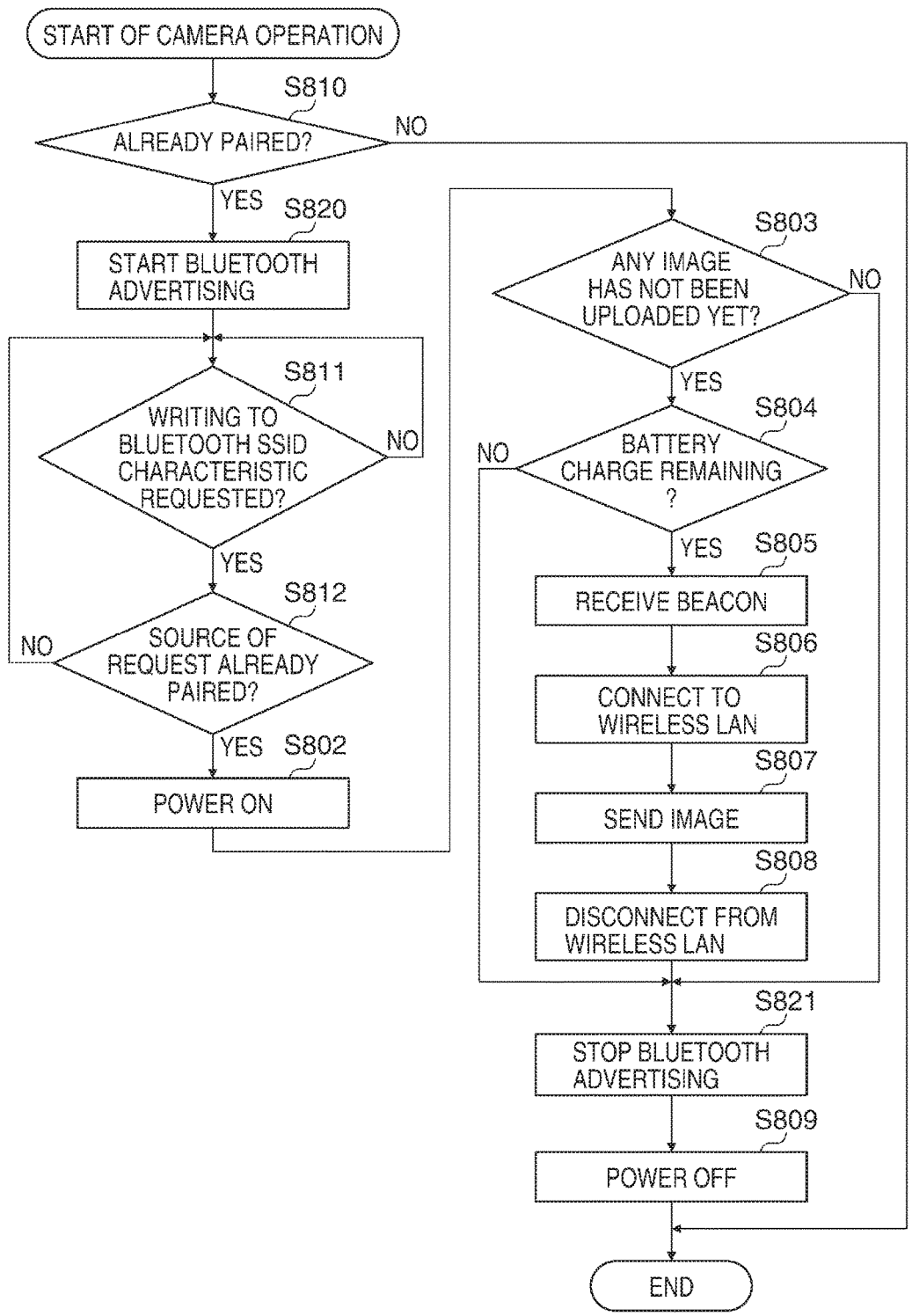
FIG. 8 is a flowchart useful in explaining how the camera operates during image transmission in FIG. 7.

FIG. 8 is a flowchart useful in explaining how the camera A100 operates during image transmission in FIG. 7. It should be noted that the process of the flowchart in the figure is carried out by the control unit A101 and the sub control unit A120.

The process of the flowchart in the figure is started when an instruction to start standing by until an access point detection notification is received from the smart phone B100 is received after the SSID of the access point C100 to which connection is desired is registered by the user operating the touch panel of the operating unit A105. While being on standby, the camera A100 is in the standby state.

In step S810, the sub control unit A120 judges whether or not one or more pieces of central ID information on a paired BLE device are stored in the incorporated nonvolatile memory. Upon judging that there is no central ID information, the sub control unit A120 carries out a process in step S809, to be described later, and then terminates the process. On the other hand, when the access point C100 judges that there is central ID information, the process proceeds to step S820.

In the step S820, the sub control unit A120 advertises information for starting pairing using the power-saving wireless communication unit A112. For example, the sub control unit A120 advertises the AP Find Service for pairing using the BLE GATT profile.

In the step S220 described with reference to FIG. 2, the AP Find Service is advertised with a null value set as the central ID characteristic, and a character string "Initializing" set as the status characteristic. This advertisement using BLE is repeated by the power-saving wireless communication unit A112 until there is an explicit stop instruction.

Then, in step S811, the sub control unit A120 judges whether or not a request to write to the SSID characteristic of the AP Find Service has been issued to the power-saving wireless communication unit A112. When there has not been the writing request, the sub control unit A120 repeatedly carries out the process in the step S811 until it receives the writing request. On the other hand, when the sub control unit A120 judges that there has been the writing request, the process proceeds to step S812. It should be noted that the writing request received in the step S811 corresponds to a writing request sent from the smart phone B100 in step S911 in FIG. 9, to be described later.

In the step S812, the sub control unit A120 judges whether or not the writing request received in the step S811 was sent from a paired BLE device. Here, the sub control unit A120 judges whether or not a central ID of a central that issued the writing request is stored in the nonvolatile memory incorporated in the sub control unit A120, that is, whether or not the central that issued the writing request is a central configured through pairing setting described with reference to FIG. 2.

Upon judging that the writing request was from the paired BLE device, the sub control unit A120 stores a value of the SSID characteristic of the AP Find Service in the incorporated nonvolatile memory, followed by the process proceeding to step S802. On the other hand, when the sub control unit A120 judges that the writing request was not from the paired BLE device, the process returns to the step S811.

In the step S802, the sub control unit A120 brings the camera A100 into the power-on state using the power supply management unit A107. This enables the power-saving wireless communication unit A111 to receive a beacon packet from the access point C100. It should be noted that the process in the step S802 corresponds to the process in the step S713 in FIG. 7.

Then, in step S803, the control unit A101 judges whether or not on the recording medium A110, there are a predetermined number of or more images that have not been uploaded yet. When the control unit A101 judges that there are a predetermined number of or more images that have not been uploaded yet, the process proceeds to step S804.

On the other hand, when the control unit A101 judges that the number of images that have not yet been uploaded is smaller than the predetermined number, the process proceeds to step S821. To judge that an image has not been uploaded yet, for example, the control unit A101 may embed a flag, which indicates that an image has not yet been uploaded, in an extended information area of the image obtained during shooting, and at the time of uploading, the control unit A101 may change this flag to "uploaded". The predetermined number may be one or may be determined by the user through the operating unit A105.

Then, in the step S804, the control unit A101 uses the power supply management unit A107 to judge whether or not the remaining amount of a battery (battery power supply) is equal to or greater than a predetermined remaining amount. When the control unit A101 judges that the remaining amount of the battery is equal to or greater than the predetermined remaining amount, the process proceeds to step S805. On the other hand, when the control unit A101 judges that the remaining amount of the battery is smaller than the predetermined remaining amount, the process proceeds to the step S821.

In the step S805, the control unit A101 uses the wireless communication unit A111 to receive a beacon packet broadcasted from the access point C100 by wireless LAN communication. The process in the step S805 corresponds to the process in the step S714 in FIG. 7. It should be noted that the control unit A101 may bring the camera 100 into the standby state using the power supply management unit A107 when no beacon packet is received.

Then, in step S806, the control unit A101 establishes a wireless LAN communication with the access point C100 based on access point information included in the received beacon packet and password information stored in advance in the nonvolatile memory A103. The process in the step S806 corresponds to the process in the step S715 in FIG. 7.

Then, in step S807, the control unit A101 transmits all images, which have not yet been uploaded, to the access point C100 using the wireless communication unit A111. The process in the step S807 corresponds to the process in the step S716 in FIG. 7.

In step S808, the control unit A101 terminates the communication with the access point C100 using the wireless communication unit A111. The process in the step S808 corresponds to the process in the step S717 in FIG. 7.

Then, in the step S821, the control unit A101 stops BLE advertising started in the step S820. After that, in step S809, the control unit A101 turns off the power using the power supply management unit A107 to bring the camera 100 into the standby state. The process in the step S809 corresponds to the process in the step S718 in FIG. 7. It should be noted that there is no image that has not yet been uploaded or the remaining amount of the battery is smaller than the predetermined remaining amount, the control unit A101 may turns off the power to the camera A100.

Figure 9:
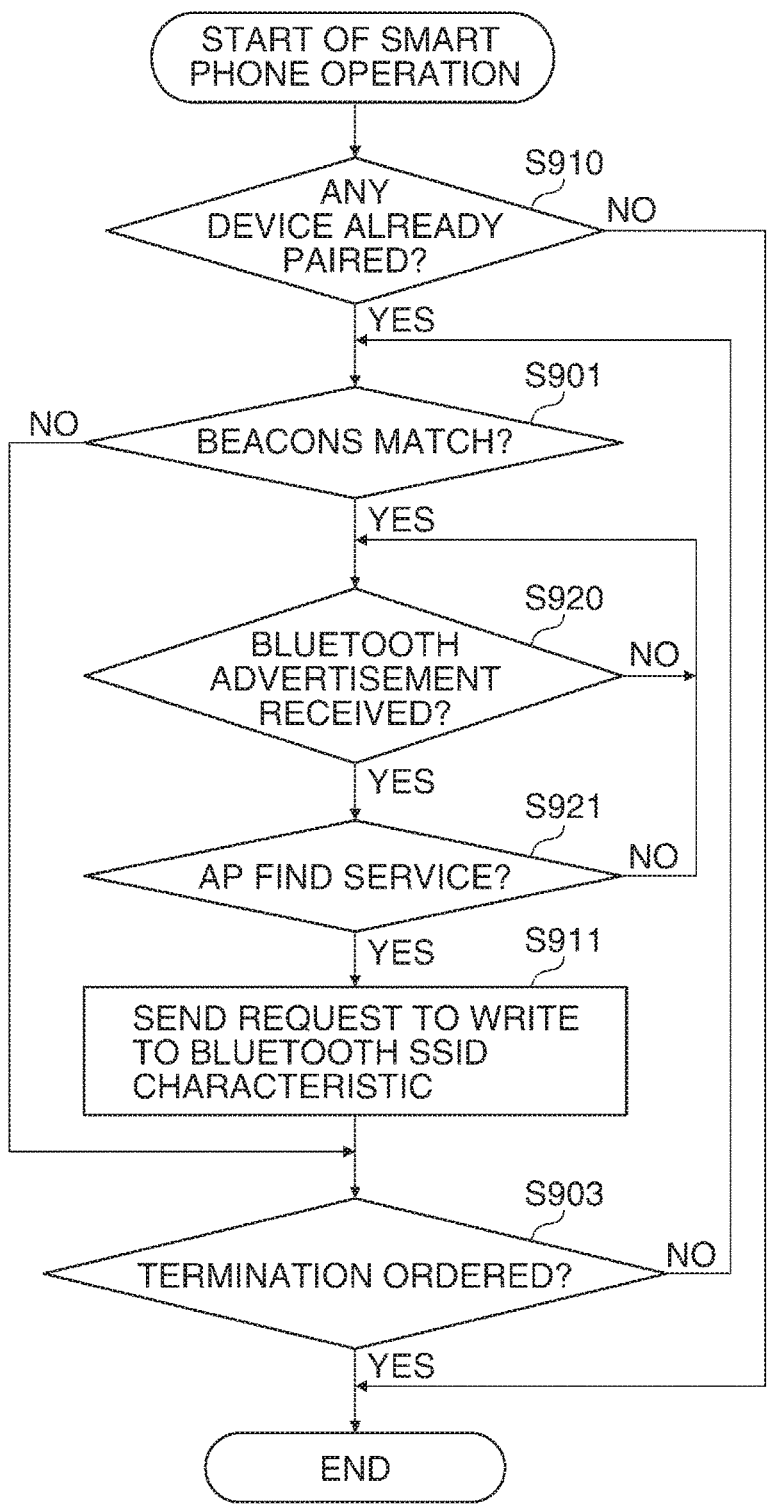
FIG. 9 is a flowchart useful in explaining how the smart phone operates during image transmission in FIG. 7.

FIG. 9 is a flowchart useful in explaining how the smart phone B100 operates during image transmission in FIG. 7.

It should be noted that the process of the flowchart in the figure is carried out by the control unit B101.

The process of the flowchart in the figure is started in response to the control unit B101 receiving an operation for starting checking of beacon packets from the operating unit B105. For example, in response to a menu operation by the user, a BLE function and a wireless LAN function are enabled for an OS (operating system) installed in the smart phone B100, and an application program (hereafter referred to merely as an app) which carries out the process of the flowchart is started. This brings the smart phone B100 into a state of standing by until it receives from a beacon packet sent from the access point C100 and starts the process of the flowchart in FIG. 9.

It is assumed that an SSID of the access point C100 to which connection is requested by the camera A100 is sent from the camera A100 to the smart phone B100 via the power-saving wireless communication unit B112 and stored in the nonvolatile memory B103 in advance. Alternatively, the user may input the SSID of the access point C100 to the smart phone B100 using the operating unit B105.

In step S910, the control unit B101 judges whether or not one or more pieces of peripheral ID information on a paired BLE device are stored in the nonvolatile memory B103. Upon judging that there is no peripheral ID information, the control unit B101 terminates the process. On the other hand, when the control unit B101 judges that there is peripheral ID information, the process proceeds to step S901.

In the step S901, the control unit B101 judges whether or not an SSID in access point information included in the received beacon packet matches the SSID stored in the nonvolatile memory B103. When the control unit B101 judges that the SSIDs match, the process proceeds to step S920. On the other hand, when the control unit B101 judges that the SSIDs do not match, the process proceeds to step S903. It should be noted that the process in the step S901 corresponds to the process in the step S711 in FIG. 7.

In the step S920, the control unit B101 judges whether or not an has been received from a BLE peripheral by the power-saving wireless communication unit B112. When the control unit B101 judges that an advertisement has been received, the process proceeds to step S921. On the other hand, upon judging that no advertisement has been received, the control unit B101 carries out the process in the step S920 again.

In the step S921, the control unit B101 judges whether or not the advertisement received in the step S920 includes the AP Find Service. When the control unit B101 judges that the advertisement does not include the AP Find Service, the process returns to the step S920. On the other hand, when the control unit B101 judges that the advertisement includes the AP Find Service, the process proceeds to step S911. The advertisement of the AP Find Service received here corresponds to the advertisement sent from the camera A100 in the process in the step S820 in FIG. 8.

In the step S911, the control unit B101 uses the power-saving wireless communication unit B112 to notify the camera A100 that the access point C100 to which connection is desired has been detected. For example, the control unit B101 sends the AP Find Service for providing an access point detection notification using the BLE GATT profile. The AP Find Service includes an SSID characteristic indicative of the SSID of the access point C100 that received the beacon in the process in the step S901.

The SSID characteristic is configured such that writing of its value requires device-to-device authentication called pairing in BLE. Thus, the control unit B101 sends a request to write to the SSID characteristic of the AP Find Service to the camera A100. It should be noted that the writing request sent in the process in the step S911 corresponds to the writing request received in the process in the step S811 in FIG. 8. Also, the process in the step S911 corresponds to the process in the step S712 in FIG. 7.

Then, in the step S903, the control unit B101 judges whether or not a process terminating instruction has been received from the user through the operating unit B105. Upon judging that a process terminating instruction has been received, the control unit B101 terminates the process. On the other hand, when the control unit B101 judges that the process terminating instruction has not been received, the process returns to the step S901.

Thus, in the first embodiment of the present invention, the camera A100 lying in the power-saving state with a wireless LAN disabled receives a BLE notification from the smart phone B100 that has detected a beacon from the access point C100. The camera A100 then enables the wireless LAN to establish a wireless LAN communication with the access point C100. This enables the camera A100 to automatically detect the access point C100, to which connection is desired, without exhausting a power source such as a battery.

Further, when image transfer is completed, the camera A100 stops BLE advertising, and this further lowers power consumption.

A description will now be given of an exemplary communication system including a communication apparatus according to a second embodiment of the present invention.

In the first embodiment described above, when image transfer is completed, and a wireless LAN is disconnected, the camera A100 stops BLE advertising. On the other hand, in the second embodiment described hereafter, even when image transfer is completed, and a wireless LAN is disconnected, the camera A100 does not stop BLE advertising.

An arrangement of the communication apparatus according to the second embodiment is the same as that of the communication apparatus in FIG. 1, and therefore, description thereof is omitted here. It is also assumed that the camera A100 and the smart phone B100 have already been paired in advance.

It should be noted that in the second embodiment, the AP Find Service includes the characteristics described above in reference to the first embodiment and additionally includes a detection state characteristic for setting a detection state of the access point C100 for the smart phone B100 from the camera A100. This detection state characteristic is configured at "start detection" and "stop detection". When the detection state characteristic is configured at "start detection", the smart phone B100 starts detecting the access point C100. When the detection state characteristic is configured at "stop detection", the smart phone B100 stops detecting the access point C100.

By configuring the detection state characteristic at "start detection", the camera A100 provides a detection start notification to the smart phone B100. On the other hand, by configuring the detection state characteristic at "stop detection", the camera A100 provides a detection stop notification to the smart phone B100. At the time of pairing, the camera A100 configures the detection state characteristic at "start detection" and advertises the AP Find Service.

Figure 10:
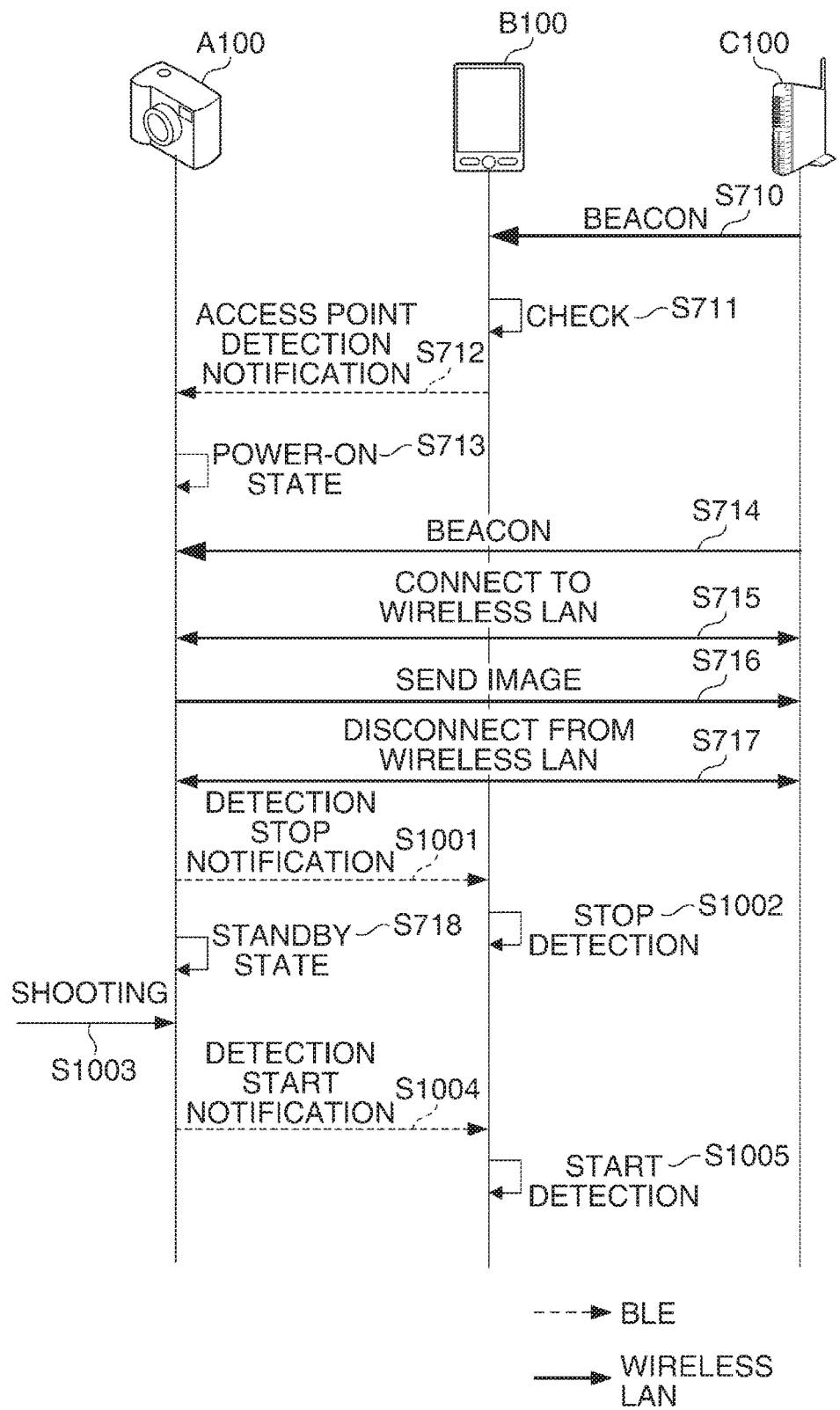
FIG. 10 is a sequence diagram useful in explaining the flow of a process from detection of an access point to sending of an image in a communication system having a communication apparatus according to a second embodiment of the present invention.

FIG. 10 is a sequence diagram useful in explaining the flow of a process from detection of an access point to sending of an image in the communication system having the communication apparatus according to the second embodiment of the present invention.

It should be noted that in FIG. 10, the same steps as those in FIG. 7 are designated by the same reference symbols, and description thereof is omitted.

After disconnecting a wireless LAN in the step S717, the camera A100 sends a detection stop notification to stop detecting the access point C100 to the smart phone B100 using BLE in step S1001.

Upon receiving the detection stop notification from the camera A100, the smart phone B100 stops sending an access point detection notification in step S1002. Then, in step S1003, the camera A100 stands by until images that have not yet been uploaded are recorded on the recording medium A110 as a result of, for example, shooting by the user.

When images that have not yet been uploaded are recorded on the recording medium A110, the camera A100 sends a detection start notification for the access point C100 to the smart phone B100 using BLE in step S1004. Upon receiving the detection start notification from the camera A100, the smart phone B100 starts sending an access point detection notification in step S1005.

Figure 11:
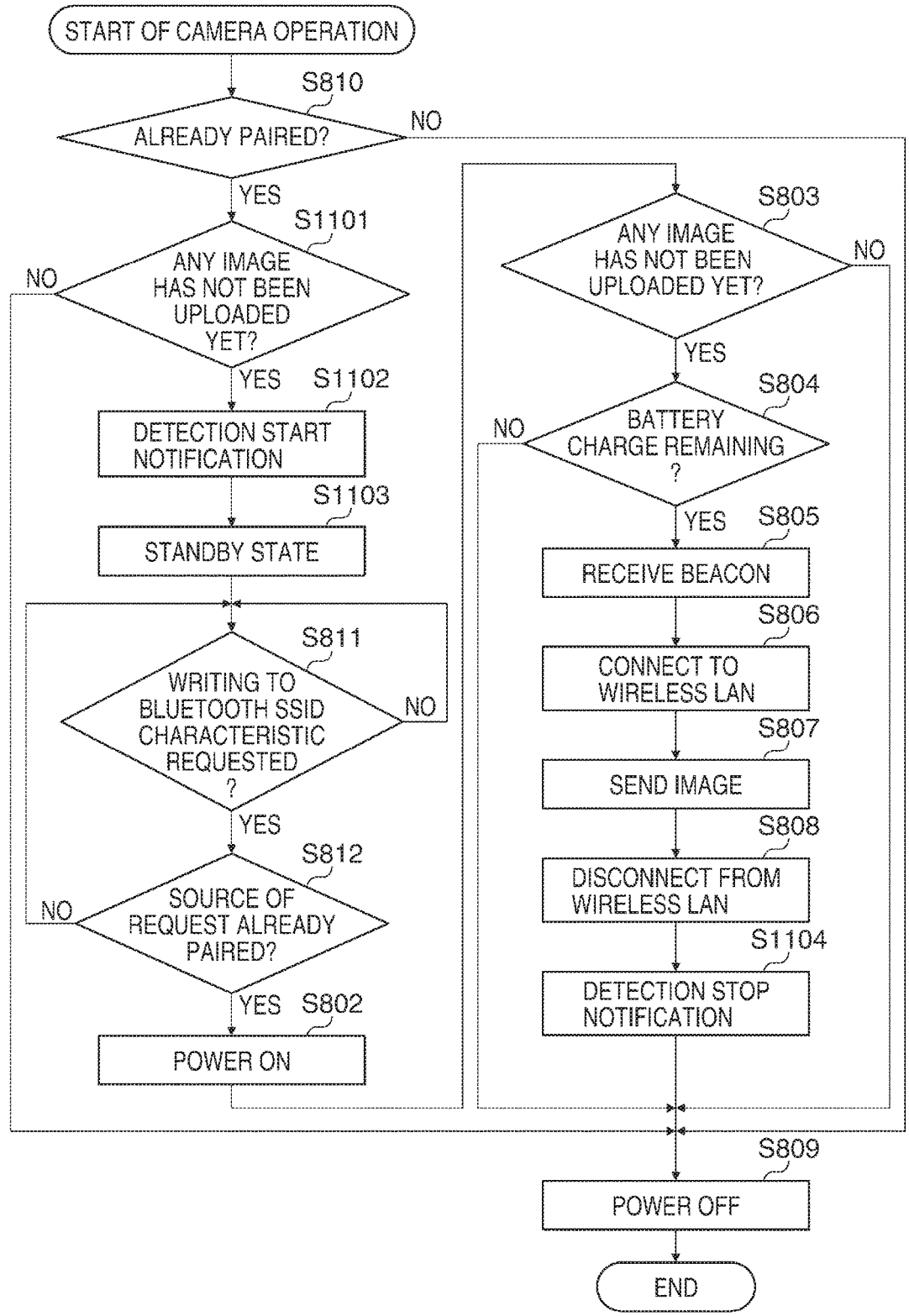
FIG. 11 is a flowchart useful in explaining how a camera operates during image transmission in the communication system according to the second embodiment of the present invention.

FIG. 11 is a flowchart useful in explaining how the camera operates during image transmission in the communication system according to the second embodiment of the present invention.

It should be noted that in the flowchart of FIG. 11, the same steps as those in FIG. 8 are designated by the same reference symbols, and description thereof is omitted. The process of the flowchart in the figure is carried out under the control of the control unit A101 and the sub control unit A120.

The process of the flowchart in FIG. 11 is started when the power is turned off using the power switch provided in the operating unit A105.

When the sub control unit A120 judges that there is central ID information, the control unit A101 judges in step s1101 whether or not on the recording medium A110, there are a predetermined number of or more images that have not yet been uploaded. When the control unit A101 judges that there are a predetermined number of or more images that have not yet been uploaded, the process proceeds to step S1102. On the other hand, when the control unit A101 judges that the number of images that have not yet been uploaded is smaller than the predetermined number, the process proceeds to the step S809.

It should be noted that to determine the number of images that have not yet been uploaded, for example, the control unit A101 may embed a flag, which indicates that an image has not yet been uploaded, in an extended information area of the image during shooting. Then, at the time of uploading, the control unit A101 may change this flag to "uploaded". Further, the predetermined number may be one or may be determined by the user through the operating unit A105.

In the step S1102, the control unit A101 sends an instruction to start detecting the access point C100 (detection request) to the smart phone B100 using the power-saving wireless communication unit A112. For example, the control unit A101 sends the detection state characteristic of the AP Find Service according to the BLE GATT profile. On this occasion, the detection state characteristic is sent as "start detection". It should be noted that the process in the step S1102 corresponds to the process in the step S1104 in FIG. 10.

Then, in step S1103, the control unit A101 brings the camera A100 into the standby state using the power supply management unit A107. After that, the control unit A101 carries out the process in the step S811 described earlier.

After carrying out the process in the step S808 described above, the control unit A101 sends an instruction to stop detecting the access point C100 to the smart phone B100 using the power-saving wireless communication unit A112 in step S1104. For example, the control unit A101 sends the detection state characteristic of the AP Find Service according to the BLE GATT profile. On this occasion, the detection state characteristic is sent as "stop detection". It should be noted that the process in the step S1104 corresponds to the process in the step S1001 in FIG. 10. After the control unit A101 carries out the process in the step S1104, the process proceeds to the step S809.

Figure 12:
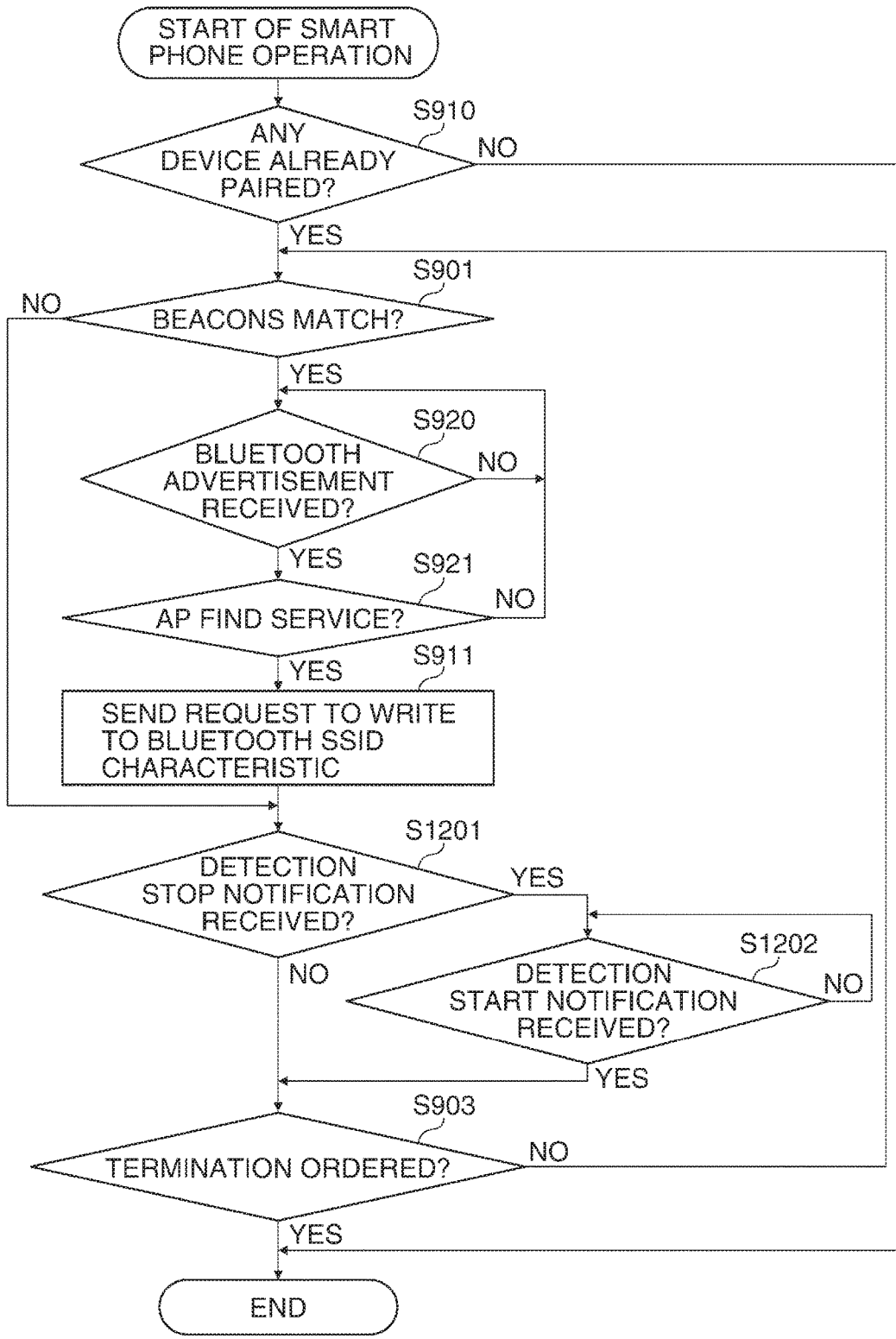
FIG. 12 is a flowchart useful in explaining how the smart phone operates during image transmission in the communication system according to the second embodiment of the present invention.

FIG. 12 is a flowchart useful in explaining how the smart phone B100 operates during image transmission in the communication system according to the second embodiment of the present invention.

It should be noted that in the flowchart in FIG. 12, the same steps as those in FIG. 9 are designated by the same reference symbols, and description thereof is omitted. The process of the flowchart in the figure is carried out under the control of the control unit B101.

After detecting no beacon packet in the step S901 or carrying out the process in the step S911, the control unit B101 judges whether or not a detection stop notification for the access point C100 to which connection is desired has been received from the camera A100 using the power-saving wireless communication unit B112 in step S1201. For example, the control unit B101 receives the detection state characteristic of the AP Find Service according to the BLE GATT profile. On this occasion, when the detection state characteristic is configured at "stop detection", the control unit B101 judges that the detection stop notification has been received.

When the control unit B101 judges that the detection stop notification has been received, the process proceeds to step S1202. On the other hand, when the control unit B101 judges that the detection stop notification has not been received, the process proceeds to the step S903.

In the step S1202, the control unit B101 judges whether or not a detection start notification for the access point C100 to which connection is desired has been received from the camera A100 using the power-saving wireless communication unit B112. For example, the control unit B101 receives the detection state characteristic of the AP Find Service according to the BLE GATT profile. On this occasion, when the detection state characteristic is configured at "start detection", the control unit B101 judges that the detection start notification has been received.

When the control unit B101 judges that the detection start notification has been received, the process proceeds to the step S903. On the other hand, upon judging that the detection start notification has not been received, the control unit B101 carries out the process in the step S1202 again.

Thus, in the second embodiment of the present invention, when it is unnecessary to detect the access point C100, the camera A100 notifies the smart phone B100 to this effect. This enables the camera A100 to stop transmission of an unnecessary detection notification from the smart phone B100.

Moreover, BLE operation requires advertising for any type of services, and hence when the camera A100 stops BLE advertising, this may interfere with other BLE services in the camera A100. In the second embodiment, BLE services other than the AP Find Service are allowed to be used at the same time because advertising is not stopped.

A description will now be given of an exemplary communication system having a communication apparatus according to a third embodiment of the present invention.

In the second embodiment described above, when the smart phone B100 detects the access point C100, an access point detection notification is sent to the camera A100 only when a detection start notification has been received from the camera A100.

In the third embodiment described hereafter, according to the number of images that have not yet been uploaded by the camera A100, the smart phone B100 judges whether or not to send an access point detection notification.

An arrangement of the communication apparatus according to the third embodiment is the same as the communication apparatus in FIG. 1, and therefore, description thereof is omitted here. It is also assumed that the camera A100 and the smart phone B100 have already been paired in advance.

It should be noted that in the third embodiment, the AP Find Service includes the characteristics described above in reference to the first embodiment and additionally includes an image count characteristic for the camera A100 to notify the smart phone B100 of the number of images that have not yet been uploaded. At the time of pairing, the AP Find Service is advertised with the image count characteristic configured at "0".

Figure 13:
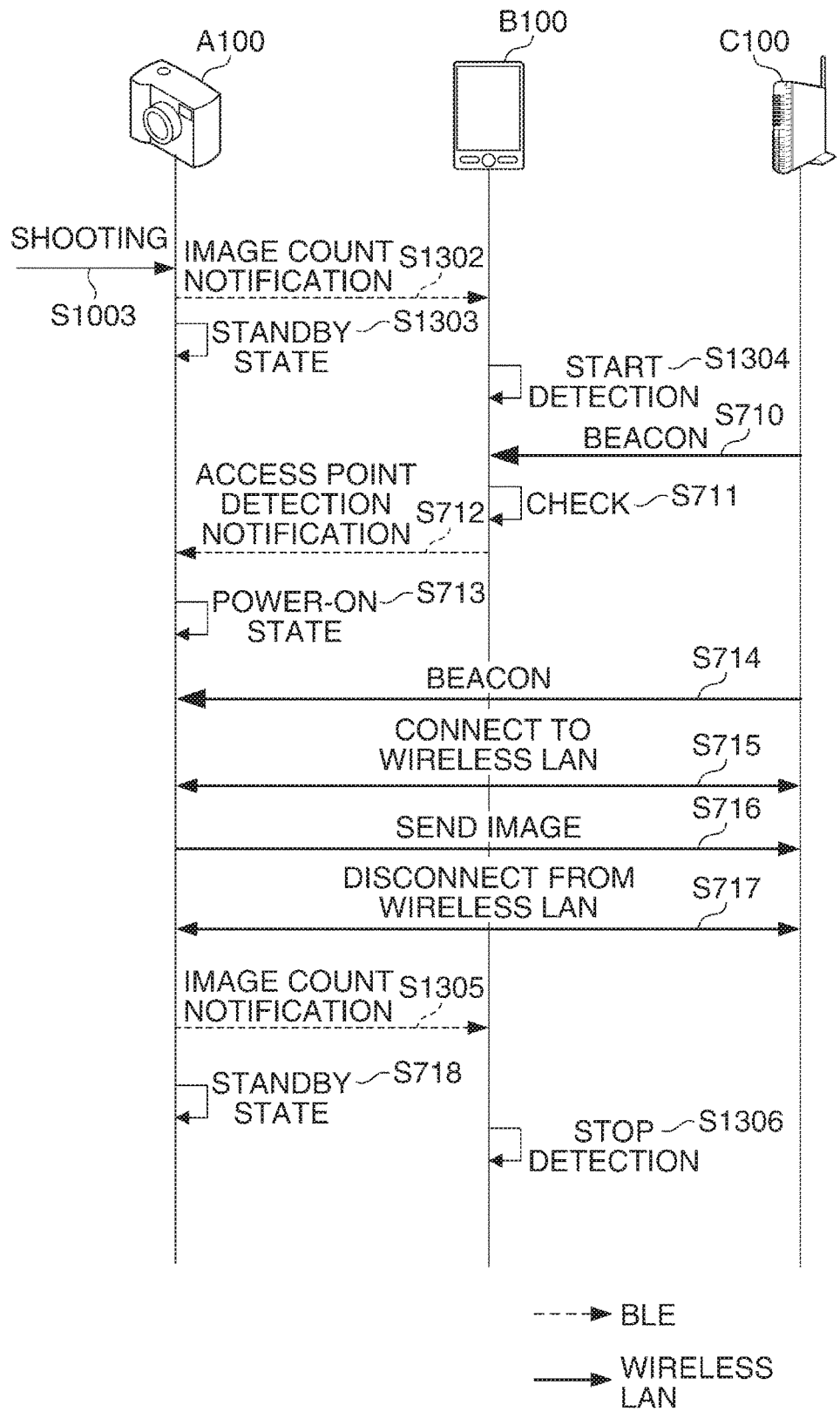
FIG. 13 is a sequence diagram useful in explaining the flow of a process from detection of an access point to sending of an image in a communication system having the communication apparatus according to a third embodiment of the present invention.

FIG. 13 is a sequence diagram useful in explaining the flow of a process from detection of an access point to sending of an image in the communication system having the communication apparatus according to the third embodiment of the present invention.

It should be noted that in FIG. 13, the same steps as those in FIG. 7 are designated by the same reference symbols, and description thereof is omitted.

In step S1301, the camera A100 receives a process such as shooting by the user in which the number of images that have not been uploaded changes. Then, upon receiving a power-off operation using the power switch, the camera A100 sends an image count notification indicative of the number of images that have not yet been uploaded to the smart phone B100 using BLE in step S1302. After that, in step S1303, the camera A100 is brought into the standby state.

Upon receiving the image count notification from the camera A100, the smart phone B100 decides in step S1304 whether or not to start sending an access point detection notification. The decision made in the step S1304 will be described later.

Here, when the smart phone B100 decides to start sending an access point detection notification, operations from reception of a beacon packet in the step S710 described above to disconnection of a wireless LAN by the camera A100 in the step S717 described above are performed.

After the process in the step S717, the camera A100 sends an image count notification indicative of the number of images that have not yet been uploaded to the smart phone B100 using BLE in step S1305 before shifting into the standby state. The camera A100 then shifts into the standby state in the step S718.

Upon receiving the image count notification, which is indicative of the number of images that have not yet been uploaded, from the camera A100, the smart phone B100 decides in step S1306 whether or not to stop sending the access point detection notification. The decision made in the step S1306 will be described later.

In the example shown in the figure, the number of images the smart phone B100 is notified of in the step S1305 is zero because images were sent in the step S716. Therefore, the smart phone B100 stops sending the access point detection notification.

Figure 14:
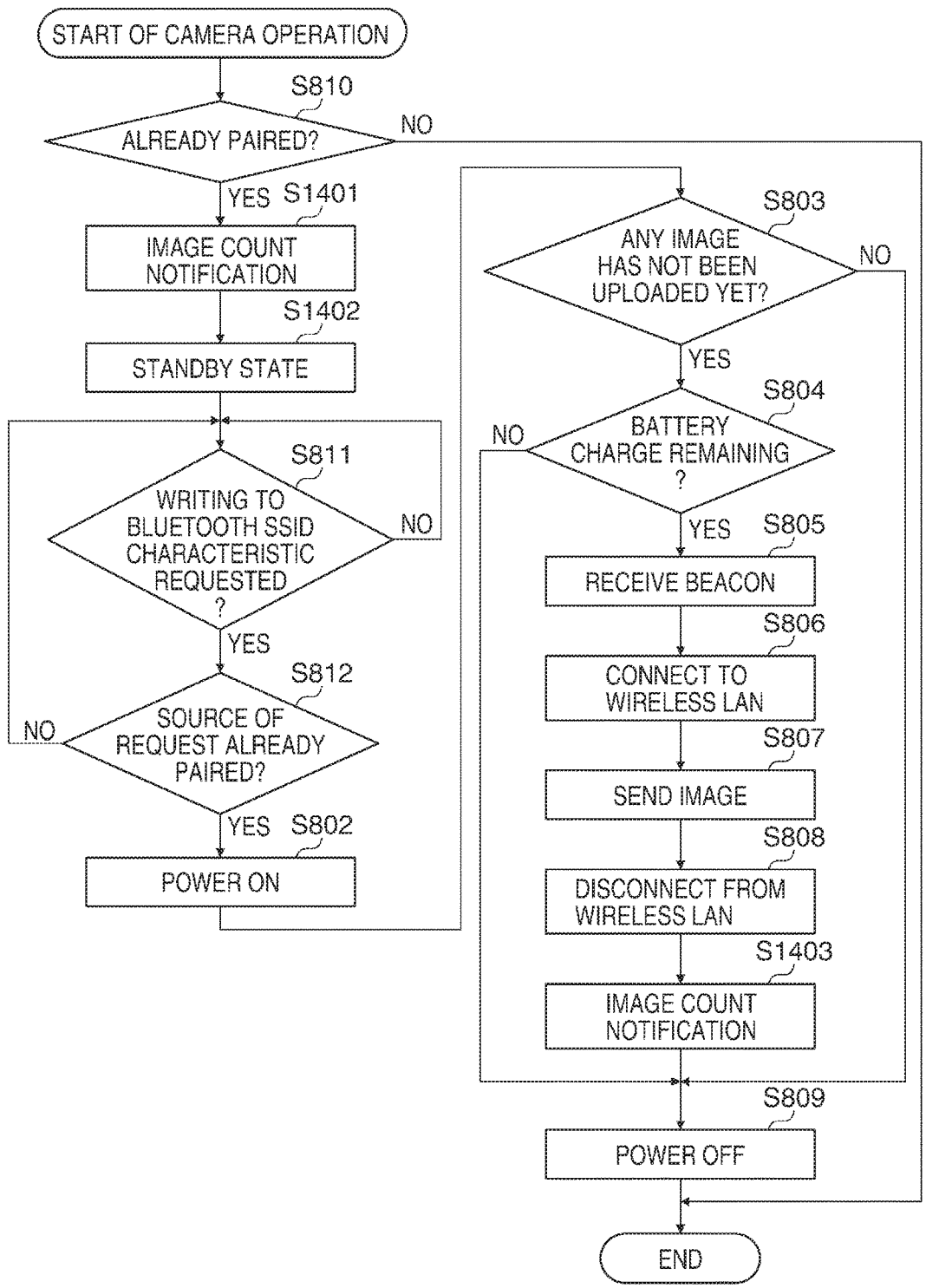
FIG. 14 is a flowchart useful in explaining how a camera operates during image transmission in the communication system according to the third embodiment of the present invention.

FIG. 14 is a flowchart useful in explaining how the camera operates during image transmission in the communication system according to the third embodiment of the present invention.

It should be noted that in the flowchart in FIG. 14, the same steps as those in FIG. 8 are designated by the same reference symbols, and description thereof is omitted. The process of the flowchart in the figure is carried out under the control of the control unit A101 and the sub control unit A120.

The process of the flowchart in FIG. 14 is started when the control unit A101 is instructed to turn off the power by the power switch provided in the operating unit A105.

When the sub control unit A120 judges that there is central ID information, the control unit A101 counts, in step S1401, the number of images on the recording medium A110 that have not yet been uploaded. The control unit A101 then sends an image count notification indicative of the number of images that have not yet been uploaded to the smart phone B110 using the power-saving wireless communication unit A112.

For example, the control unit A101 sends the image count characteristic of the AP Find Service according to the BLE GATT profile. On this occasion, the number of images that have not yet been uploaded is written to the image count characteristic. The process in the step S1401 corresponds to the step S1302 in FIG. 13.

It should be noted that to determine the number of images that have not yet been uploaded, the control unit A101 may embed a flag, which indicates that an image has not yet been uploaded, in an extended information area of the image during shooting. Then, at the time of uploading, the control unit A101 may change this flag to "uploaded".

Then, in step S1402, the control unit A101 brings the camera A100 into the standby state using the power supply management unit A107. After that, the process proceeds to the step S811.

After carrying out the process in the step S808, the control unit A101 counts, in step S1403, the number of images on the recording medium A110 that have not yet been uploaded. The control unit A101 then sends an image count notification indicative of the number of images that have not yet been uploaded to the smart phone B110 using the power-saving wireless communication unit A112. For example, the control unit A101 sends the image count characteristic of the AP Find Service according to the BLE GATT profile. On this occasion, the number of images that have not yet been uploaded is written to the image count characteristic. The process in the step S1403 corresponds to the step S1305 in FIG. 13.

FIG. 15 is a flowchart useful in explaining how the smart phone B100 operates during image transmission in the communication system according to the third embodiment of the present invention.

It should be noted that in the flowchart in FIG. 15, the same steps as those in FIG. 9 are designated by the same reference symbols, and description thereof is omitted. The process of the flowchart in the figure is carried out under the control of the control unit B101.

In the step S910, when the control unit B101 judges that there is peripheral ID information, the process proceeds to step S1501.

In the step S1501, the control unit B101 judges whether or not an image count notification has been received from the camera A100 using the power-saving wireless communication unit B112. For example, the control unit B101 judges whether or not the image count characteristic of the AP Find Service according to the BLE GATT profile has been received.

When an image count notification has been received, the control unit B101 reads the image count characteristic, followed by the process proceeding to step S1502. On the other hand, when no image count notification has been received, the control unit B101 carries out the process in the step S1501 again.

In the step S1502, the control unit B101 judges whether or not the number of images received in the step S1501 is equal to or greater than a predetermined number. When the control unit B101 judges that the number of images is equal to or greater than the predetermined number, the process proceeds to the step S901. On the other hand, when the control unit B101 judges that the number of images is smaller than the predetermined number, the process proceeds to the step S903.

It should be noted that the predetermined number may be one or may be determined by the user through the operating unit B105.

As described above, in the third embodiment of the present invention, the camera A100 notifies the smart phone B100 of the number of images that have not yet been uploaded. This enables the smart phone B100 to easily judge whether or not to send an access point detection notification to the camera A100.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

A100 Digital camera
A101, B101 Control unit
A102, B102 Image pickup unit
A106, B106 Display unit
A111, B111 Wireless communication unit
A112, B112 Power-saving wireless communication unit
A120 Sub control unit
B100 Smart phone
B113 Public wireless communication unit
C110 Access point

The invention claimed is:

1. A mobile phone comprising:
   a first communication interface configured to receive a signal sent from an access point using a first communication system;
   a second communication interface configured to communicate with an image pickup apparatus different from the access point using a second communication system different from the first communication system;
   a memory configured to record a predetermined information which is used by the image pickup apparatus for communicating with the access point; and
   a processor configured to compare the predetermined information which is recorded in the memory and a received information included in the signal received by said first communication interface,
   wherein, when the predetermined information and the received information are the same, the processor controls said second communication interface, using the second communication system, to transmit a signal to the image pickup apparatus so as to start a communication interface of the image pickup apparatus to thereby connect the communication interface of the image pickup apparatus to the access point, and
   when the predetermined information and the received information are not the same, the processor controls said second communication system so as not to send the signal to the image pickup apparatus, and
   wherein power consumed by communication using said second communication interface is lower than power consumed by communication using said first communication interface.

2. The mobile phone according to claim 1, wherein even when said first communication interface receives a signal, whether the predetermined information which is recorded in the memory and a received information included in the signal received by said first communication interface are the same is not judged in a case where said second communication interface is not connected to the image pickup apparatus.

3. The mobile phone according to claim 1, wherein the received information is a network identifier that is generated by the predetermined access point so as to identify a network.

4. The mobile phone according to claim 1, wherein by comparing a network identifier included in the signal received from the access point using said first communication interface with a network identifier received in advance from the image pickup apparatus, said processor judges whether the predetermined information which is recorded in the memory and a received information included in the signal received by said first communication interface are the same.

5. The mobile phone according to claim 1, wherein in response to requests from the image pickup apparatus, the mobile phone switches between a mode in which a signal for starting the communication interface of the image pickup apparatus is not sent even when a signal is received from the predetermined access point, and a mode in which a signal for starting the communication interface of the image pickup apparatus is sent.

6. The mobile phone according to claim 1, wherein when the image pickup apparatus leaves a network of the predetermined access point, the mobile phone switches to a mode in which a signal for starting the communication interface of the image pickup apparatus is not sent even when a signal is received from the predetermined access point.

7. The mobile phone according to claim 1, wherein the first communication system is a wireless LAN, and the mobile phone acts as a client.

8. The mobile phone according to claim 1, wherein the second communication system is Bluetooth, and the mobile phone acts as a central.

9. The mobile phone according to claim 1, wherein in response to reception of an advertising signal sent from the communication interface of the image pickup apparatus, which carries out communications using the second communication system, in a state in which a signal from the predetermined access point has been received using said first communication interface, said processor provides control to send a signal for starting the communication interface of the image pickup apparatus, which carries out communications using the first communication system, to the image pickup apparatus using said second communication interface.

10. The mobile phone according to claim 1, wherein the image pickup apparatus is a camera.

11. The mobile phone according to claim 1, further comprising a third communication interface configured to connect to a telephone network.

12. The mobile phone according to claim 1, further comprising:
    an operation unit; and
    a recording unit,
    wherein the processor controls the operation unit to receive from a user a user operation for inputting a connect information for using to establish connection between the access point and the image pickup apparatus via the first communication system, and
    wherein the processor controls the recording unit to connect information inputted by the user operation.

13. The mobile phone according to claim 1, wherein the processor receives a detect stop notification, and the processor controls not to send a signal for starting a first communication interface of the image pickup apparatus by said second communication interface using the second communication system.

14. A control method for a mobile phone which has a first communication interface that receives a signal sent from an access point using a first communication system, and a second communication interface that communicates with an image pickup apparatus different from the access point using a second communication system different from the first communication system, comprising:
    recording, in a memory, a predetermined information which is used by the image pickup apparatus for communicating with the access point; and
    comparing the predetermined information which is recorded in the memory and a received information included in the signal received by said first communication interface,
    wherein when the predetermined information and the received information are the same, controlling said second communication interface, using the second communication system, to transmit a signal to the image pickup apparatus so as to start a communication interface of the image pickup apparatus to thereby connect the communication interface of the image pickup apparatus to the access point, and
    when the predetermined information and the received information are not the same, controlling said second communication system so as not to send the signal to the image pickup apparatus, and wherein power consumed by communication using the second communication interface is lower than power consumed by communication using the first communication interface.

15. A non-transitory computer-readable storage medium storing a program that when executed causes a computer to perform a control method for a mobile phone which has a first communication interface that receives a signal sent from an access point using a first communication system, and a second communication interface that communicates with an image pickup apparatus different from the access point using a second communication system different from the first communication system, the control method comprising:
  recording, in a memory, a predetermined information which is used by the image pickup apparatus for communicating with the access point; and
  comparing the predetermined information which is recorded in the memory and a received information included in the signal received by said first communication interface, wherein when the predetermined information and the received information are the same, controlling said second communication interface, using the second communication system, to transmit a signal to the image pickup apparatus so as to start a communication interface of the image pickup apparatus to thereby connect the communication interface of the image pickup apparatus to the access point, and when the predetermined information and the received information are not the same, controlling said second communication system so as not to send the signal to the image pickup apparatus, and wherein power consumed by communication using the second communication interface is lower than power consumed by communication using the first communication interface.

* * * * *